US012678838B2

(12) United States Patent (10) Patent No.: US 12,678,838 B2

Taylor et al. (45) Date of Patent: Jul. 14, 2026

(54) NOZZLE ASSEMBLY

(71) Applicant: SONNY'S HFI HOLDINGS, LLC, Wilmington, DE (US)

(72) Inventors: Ian Marc Taylor, Inver Grove Heights, MN (US); Jeffrey David Boily, Eagan, MN (US)

(73) Assignee: Sonny's HFI Holdings, LLC, Wilmington, DE (US)

( * ) Notice: Subject to any disclaimer, the term of this patent is extended or adjusted under 35 U.S.C. 154(b) by 225 days.

(21) Appl. No.: 18/383,508

(22) Filed: Oct. 25, 2023

(65) Prior Publication Data

US 2024/0139786 A1 May 2, 2024

Related U.S. Application Data

(60) Provisional application No. 63/419,409, filed on Oct. 26, 2022.

(51) Int. Cl.

| | |
|---|---|
| *B08B 9/049* | (2006.01) |
| *F16D 63/00* | (2006.01) |
| *B05B 1/14* | (2006.01) |
| *B05B 1/34* | (2006.01) |
| *B05B 3/00* | (2006.01) |

(Continued)

(52) U.S. Cl.
CPC .......... B08B 9/0495 (2013.01); F16D 63/002 (2013.01); B05B 1/14 (2013.01); B05B 1/3402 (2018.08); B05B 3/006 (2013.01); B05B 3/043 (2025.08); B05B 3/06 (2013.01)

(58) Field of Classification Search
CPC ......... B08B 9/0495; B05B 1/14; B05B 3/006; B05B 3/043; B05B 3/06; B05B 1/3402; F16D 63/002
See application file for complete search history.

(56) References Cited

U.S. PATENT DOCUMENTS

| | | | |
|---|---|---|---|
| 3,370,599 | A | 2/1968 | Ciaccio |
| 4,434,951 | A | 3/1984 | Nakajima |
| 4,677,997 | A | 7/1987 | Strauss |

(Continued)

FOREIGN PATENT DOCUMENTS

| | | | | |
|---|---|---|---|---|
| AU | 2008359977 B2 | 11/2016 | | |
| CA | 2261110 C | * 6/2007 | ........... | B08B 9/0551 |

(Continued)

OTHER PUBLICATIONS

"RotoMagTM X22," Jetstream, 9 pages from <https://waterblast.com/22k-rotomag-x22> 2022.

(Continued)

*Primary Examiner* — Benjamin L Osterhout

(74) *Attorney, Agent, or Firm* — Dorsey & Whitney LLP

(57) ABSTRACT

A nozzle assembly includes a stator including a front portion optionally with a first nozzle configured to direct an optional first stream of a cleaning fluid in a forward direction of the nozzle assembly, a rear portion including a second nozzle configured to direct a second stream of the cleaning fluid rearward of the nozzle assembly, a rotor disposed between the front portion and the rear portion along a longitudinal axis of the nozzle assembly and including a third nozzle configured to direct a third stream of the cleaning fluid; and a magnetic brake disposed between the stator and rotor.

19 Claims, 16 Drawing Sheets

(51) Int. Cl.
   *B05B 3/04*        (2006.01)
   *B05B 3/06*        (2006.01)

(56)          References Cited

U.S. PATENT DOCUMENTS

| | | | |
|---|---|---|---|
| 4,853,573 | A | 8/1989 | Wolcott et al. |
| 5,060,862 | A | 10/1991 | Pacht |
| 5,104,043 | A | 4/1992 | Pacht |
| 5,107,873 | A | 4/1992 | Clinger |
| 5,141,158 | A | 8/1992 | Allen |
| 5,236,126 | A | 8/1993 | Sawade et al. |
| 5,402,936 | A | 4/1995 | Hammelmann |
| 5,720,309 | A | 2/1998 | Baziuk |
| 5,909,848 | A | 6/1999 | Zink |
| 5,964,414 | A | 10/1999 | Hardy et al. |
| 6,070,285 | A * | 6/2000 | Geppert ............... B08B 9/0553 |
| | | | 15/104.061 |
| 6,098,642 | A | 8/2000 | Crane |
| 6,698,669 | B2 | 3/2004 | Rieben |
| 6,766,967 | B2 | 7/2004 | Harris et al. |
| 6,814,304 | B2 | 11/2004 | Onofrio |
| 6,840,315 | B2 | 1/2005 | Jarchau et al. |
| 7,111,796 | B2 | 9/2006 | Olson |
| 7,195,079 | B2 | 3/2007 | Self et al. |
| 7,546,959 | B2 | 6/2009 | Wagner et al. |
| 7,654,340 | B2 | 2/2010 | Self et al. |
| 8,298,349 | B2 | 10/2012 | Wojciechowski et al. |
| 8,500,042 | B2 | 8/2013 | Brown et al. |
| 8,544,768 | B2 | 10/2013 | Wright |
| 8,863,775 | B2 | 10/2014 | Zink et al. |
| 9,022,057 | B2 | 5/2015 | Zink |
| 9,067,220 | B2 | 6/2015 | Wright |
| 9,321,067 | B2 | 4/2016 | Schaer et al. |
| 9,468,954 | B1 | 10/2016 | Olsson et al. |
| 9,657,790 | B2 | 5/2017 | Sesser et al. |
| 9,731,303 | B2 | 8/2017 | Harris et al. |
| 9,791,382 | B2 | 10/2017 | Olsson et al. |
| 9,914,157 | B2 | 3/2018 | Olsson et al. |
| 10,010,894 | B2 | 7/2018 | Andersen |
| 10,065,221 | B2 | 9/2018 | Wojciechowski et al. |
| 10,359,368 | B1 | 7/2019 | Olsson et al. |
| 10,598,449 | B2 | 3/2020 | Tischler et al. |
| 10,921,263 | B1 | 2/2021 | Olsson et al. |
| 11,103,901 | B2 | 8/2021 | Lendi |
| 11,199,510 | B1 | 12/2021 | Olsson et al. |
| 2014/0008459 | A1 | 1/2014 | Wright |
| 2016/0129458 | A1 * | 5/2016 | Lendi ........................ B05B 3/06 |
| | | | 188/267 |
| 2018/0038093 | A1 | 2/2018 | Olsson et al. |
| 2018/0161788 | A1 | 6/2018 | Wiggins |
| 2019/0314875 | A1 * | 10/2019 | Lendi ..................... B05B 3/006 |
| 2021/0252531 | A1 | 8/2021 | Boily |
| 2022/0062925 | A1 | 3/2022 | Wright et al. |

FOREIGN PATENT DOCUMENTS

| | | | | |
|---|---|---|---|---|
| CH | 690710 | A5 * | 12/2000 | ............... E03F 9/00 |
| CH | 707524 | A2 | 7/2014 | |
| CH | 714885 | B1 | 10/2021 | |
| CN | 210753281 | U | 6/2020 | |
| DE | 10029663 | A1 | 1/2002 | |
| DE | 202007012640 | U1 * | 11/2007 | .......... B08B 9/0433 |
| DE | 202013100985 | U1 | 5/2013 | |
| DE | 202019101549 | U1 | 6/2019 | |
| DE | 202019101703 | U1 * | 6/2019 | ........ B05B 13/0636 |
| EP | 1163959 | A2 * | 12/2001 | .............. B05B 3/06 |
| JP | 2005118749 | A | 5/2005 | |
| NL | 1030050 | C1 | 3/2007 | |
| WO | WO-03025339 | A1 * | 3/2003 | ............ E21B 37/00 |
| WO | 2010012018 | A1 | 2/2010 | |

OTHER PUBLICATIONS

International Search Report and Written Opinion dated Feb. 26, 2024 in connection with International Patent Application No. PCT/US2023/035846, 17 pages.

\* cited by examiner

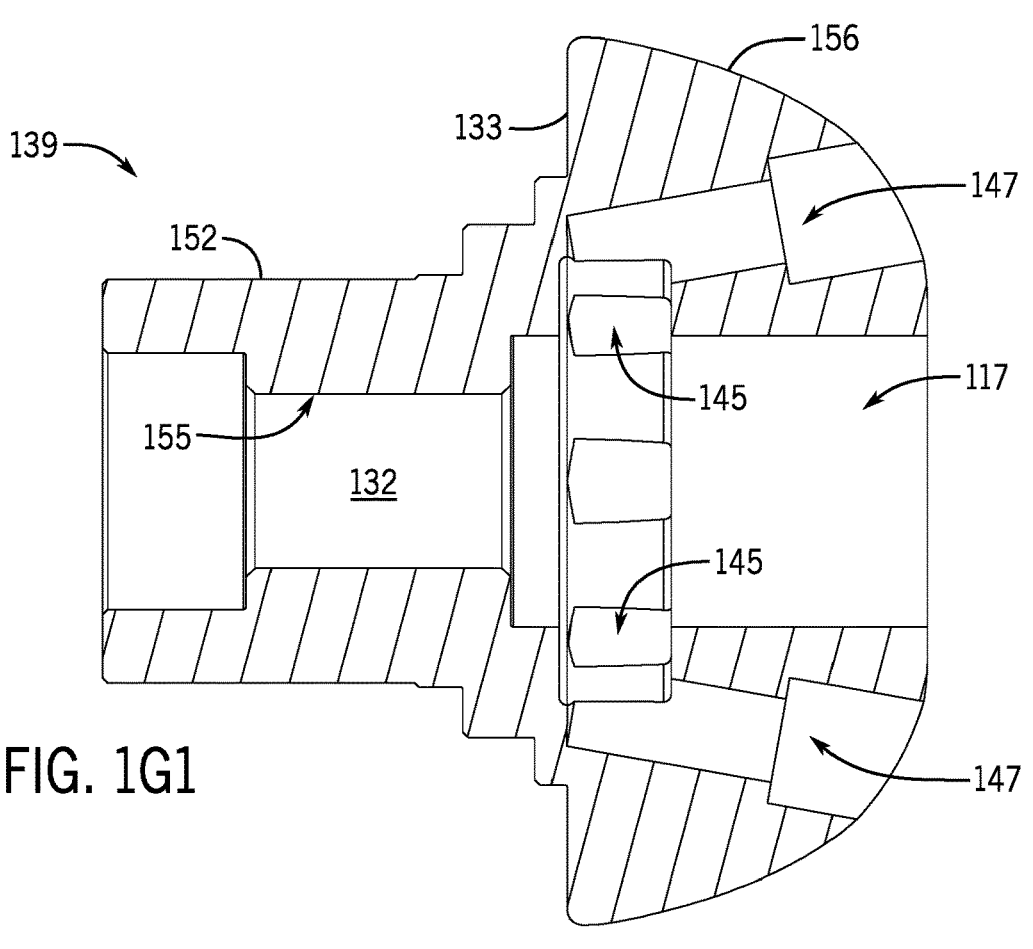
FIG. 1G1
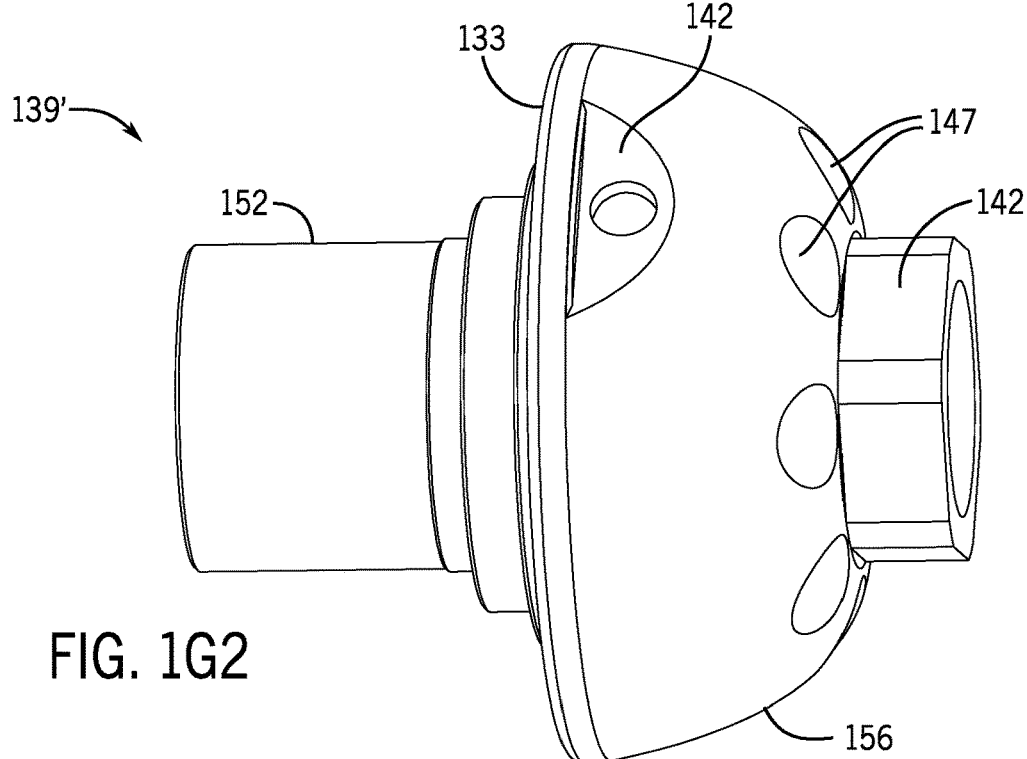
FIG. 1G2

NOZZLE ASSEMBLY

CROSS-REFERENCE TO RELATED APPLICATION(S)

This application claims priority to U.S. Provisional Patent Application No. 63/419,409, filed Oct. 26, 2022, entitled "Nozzle Assembly," which is incorporated by reference herein, in the entirety and for all purposes.

TECHNICAL FIELD

This application relates generally to nozzle assemblies suitable for cleaning pipelines and/or vessels with a cleaning fluid.

BACKGROUND

To keep sewer and water pipes and other conduits free from clogging matter such as debris, roots, scale, and the like, nozzle assemblies are often used. A nozzle assembly may receive a cleaning fluid, such as water, at elevated pressure and/or temperature. The nozzle assembly may distribute the cleaning fluid via one or more nozzles that emit a stream of the cleaning fluid against the wall of the conduit to wash the clogging matter from the walls of the conduit. In many cases, a portion of the nozzle assembly, including one or more nozzles, may rotate such that the stream of cleaning fluid passes over a substantial portion of the inner surface of the conduit by "rastering" or impinging successive passes of the stream on the surface in a circular or spiral, especially a tight even overlapping spiral, pattern. Some nozzle assemblies include blades or cutters that can cut roots that may have infiltrated the conduit. The rotational motion may assist in the cutting action.

Many nozzle assemblies use mechanical, viscous fluid, and/or friction brakes or the like to limit or control the rotational speed of the spinning portion of the nozzle. In many cases, if a brake is not used, the nozzle assembly may over-speed and become damaged, may not clean effectively, and/or may wear prematurely. Existing braking technology is itself prone to early wear-out and failure, resulting in downtime, failed cleaning service trips, uncontrolled rotational speed, ineffective cleaning, and other undesirable expenses. For example, some nozzles that use existing braking technology may spin faster over time as the brake wears out, causing ineffective cleaning or dangerous over-speed events. In other cases, a brake may cause a nozzle to slow down over time, or stop, making the nozzle ineffective at cleaning the conduit. Improved nozzle assembly braking solutions are therefore desired.

SUMMARY

In one embodiment, a nozzle assembly includes: a stator with: a front portion including a first nozzle configured to direct a first stream of a cleaning fluid in a forward direction of the nozzle assembly, and a rear portion including a second nozzle configured to direct a second stream of the cleaning fluid rearward of the nozzle assembly; a rotor disposed between the front portion and the rear portion along a longitudinal axis of the nozzle assembly and including a third nozzle configured to direct a third stream of the cleaning fluid; and a magnetic brake disposed between the stator and the rotor.

Optionally, in some embodiments, the magnetic brake includes a magnet disposed on a protrusion of the rear portion; and a conductor disposed within an aperture formed in the rotor.

Optionally, in some embodiments, the conductor includes a non-ferrous metal.

Optionally, in some embodiments, the non-ferrous metal is aluminum.

Optionally, in some embodiments, the nozzle assembly includes a magnetic shield disposed outward from the longitudinal axis relative to the magnet.

Optionally, in some embodiments, the magnetic shield includes a ferrous metal.

Optionally, in some embodiments, the magnet includes a cylindrical shell.

Optionally, in some embodiments, the cylindrical shell includes a plurality of radially polarized portions.

Optionally, in some embodiments, a first radially polarized portion of the plurality of radially polarized portions includes a first pole having a first magnetic polarity and a second pole having a second magnetic polarity opposite the first magnetic polarity wherein the first pole is disposed closer to the longitudinal axis than the second pole; and a second radially polarized portion of the plurality of radially polarized portions includes a third pole having the first magnetic polarity and a fourth pole having the second magnetic polarity, wherein the fourth pole is disposed closer to the longitudinal axis than the third pole.

Optionally, in some embodiments, the first radially polarized portion and the second radially polarized portion are adjacent to one another in the magnet.

Optionally, in some embodiments, the magnet includes a plurality of first radially polarized portions and a plurality of second radially polarized portions interleaved with one another in the magnet.

Optionally, in some embodiments, the magnetic brake includes a conductor disposed in the rotor, proximate to the magnet.

Optionally, in some embodiments, a direction of the third stream of the cleaning fluid causes a rotary motion of the rotor.

Optionally, in some embodiments, the rotary motion causes a relative movement between the magnet and the conductor, such that the magnet induces an eddy current in the conductor that opposes the rotary motion.

Optionally, in some embodiments, the rotary motion as a function of pressure is substantially constant over time.

Optionally, in some embodiments, the third nozzle is disposed at a first angle with respect to the longitudinal axis and is disposed at a second angle with respect to a radial axis of the nozzle assembly.

Optionally, in some embodiments, the second stream of the cleaning fluid is configured to propel the nozzle assembly along a conduit.

Optionally, in some embodiments, the nozzle assembly include a plurality of second nozzles, each configured to emit respective a plurality of second streams of the cleaning fluid.

Optionally, in some embodiments, the plurality of second nozzles are disposed circumferentially about an aperture formed in the rear portion.

Optionally, in some embodiments, the rear portion is configured to couple to a supply conduit configured to supply the cleaning fluid to the nozzle assembly.

Optionally, in some embodiments, the plurality of second nozzles are disposed at an angle with respect to the longitudinal axis of the nozzle assembly.

Optionally, in some embodiments, one or more of the first nozzle, the second nozzle, or the third nozzle includes a flow straightener.

In one embodiment, a method of cleaning a sewer pipe includes supplying a cleaning fluid to a nozzle assembly comprising: a stator comprising: a front portion including a first nozzle configured to direct a first stream of a cleaning fluid in a forward direction of the nozzle assembly and at a wall of the sewer pipe, and a rear portion including a second nozzle configured to direct a second stream of the cleaning fluid rearward of the nozzle assembly and at the wall of the sewer pipe; a rotor disposed between the front portion and the rear portion along a longitudinal axis of the nozzle assembly and including a third nozzle configured to direct a third stream of the cleaning fluid and at the sewer pipe; and a magnetic brake disposed between the stator and the rotor.

In one embodiment, a magnetic brake for a nozzle assembly includes: a magnet having a magnetic field disposed on a stator portion of the nozzle assembly; a conductor disposed within a rotor of the nozzle assembly. A nozzle disposed in the rotor assembly is configured to direct a stream of a cleaning fluid such that the stream causes a rotary motion of the rotor with respect to the stator along a longitudinal axis of the nozzle assembly, the rotary motion causes a relative movement between the magnet and the conductor, such that the magnet induces an eddy current in the conductor that resists the rotary motion; and a magnetic shield disposed further from the longitudinal axis than the conductor and the magnet reduces a field strength of the magnetic field at an external surface of the nozzle assembly.

In one embodiment a nozzle assembly includes: a stator comprising having a front portion, and a rear portion including a first nozzle configured to direct a first stream of the cleaning fluid rearward of the nozzle assembly, along with a rotor disposed between the front portion and the rear portion along a longitudinal axis of the nozzle assembly and including a second nozzle configured to direct a second stream of the cleaning fluid, and a magnetic brake disposed between the stator and the rotor.

BRIEF DESCRIPTION OF THE DRAWINGS

FIG. 1G1 is a section view of an example of a rear housing of the nozzle assembly of FIG. 1B taken along line 1F-1F of FIG. 1C.

FIG. 1G2 is an isometric view of an example of another rear housing that may be used in the assembly of FIG. 1B as an alternative to the rear housing of FIG. 1G1.

DETAILED DESCRIPTION

Nozzle assemblies of the present disclosure may be suitable to distribute a cleaning fluid on an interior surface of a conduit or vessel such as to clean or treat the interior surface thereof. In many embodiments, the cleaning fluid is supplied to the nozzle assembly at an elevated pressure, and the nozzle assembly distributes the cleaning fluid via one or more nozzles toward the interior surface of the conduit or vessel. In many embodiments, a portion of the nozzle assembly may include a stator portion and a rotor portion. The stator portion may be substantially non-rotational with respect to a supply conduit that supplies the cleaning fluid to the nozzle assembly. The rotor portion may rotate with respect to the stator portion, e.g., due to the reaction force of the cleaning fluid leaving one or more nozzles in the rotor portion.

If not controlled, the rotation of the rotor may become too fast for effective cleaning of the conduit, may result in increased wear of the nozzle assembly, may create an unsafe condition, or may cause the nozzle assembly to fail (possibly catastrophically). For example, a nozzle assembly may spin at thousands of revolutions per minute ("RPM") if no control or braking is applied.

The nozzle assemblies of the present disclosure use a magnetic braking system that can control the rotational speed of the rotor. The disclosed braking system may control the speed of the rotor over time (e.g., over tens, hundreds, or thousands of hours of use), and may thus provide benefits over known nozzles, which tend to incorrectly operate (e.g., speed up or slow down) or fail over time.

Figure 1A:
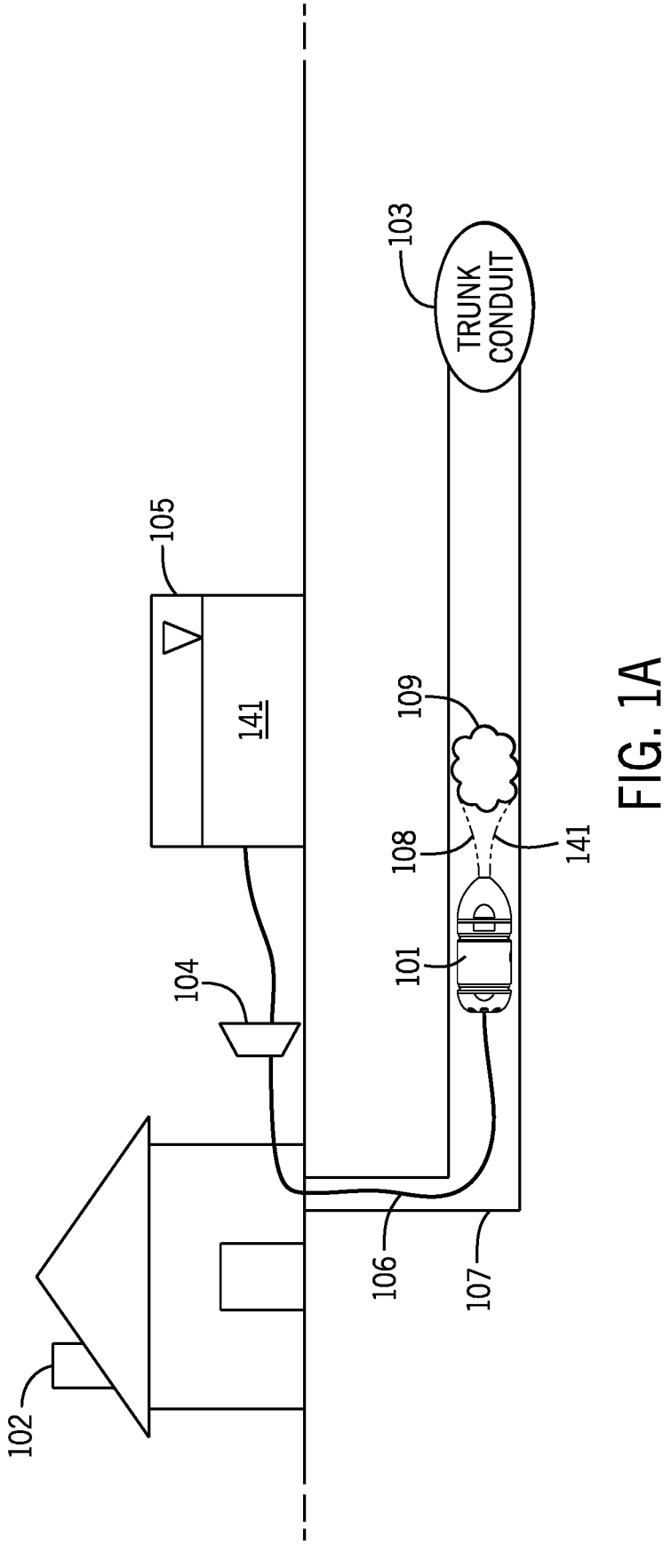
FIG. 1A is a schematic view of an embodiment of a nozzle assembly of the present disclosure being used to clean a conduit such as a sewer line.

FIG. 1A is a schematic view of an embodiment of a nozzle assembly 101 in use in a suitable application. As shown, the nozzle assembly 101 is shown in an example application being used to clean a conduit 107 of a building 102, such as a house, retail, commercial, or industrial building. The conduit 107 may carry waste from the building 102 to a trunk conduit 103 such as a sewer main. As is common with sewer lines, the conduit 107 may occasionally be clogged (either partially or fully) by a clogging material 109. Example clogging materials 109 may include sewage solids, plant roots, foreign matter or the like that have infiltrated or built up in the conduit 107. In various embodiments, a nozzle assembly 101 may be sized to clean variously sized conduits 107, such as a 2-inch, 3-inch, 4-inch, 5-inch, 6-inch, 7-inch, 8-inch, 9-inch, 10-inch, 11-inch, 12-inch, 13-inch, 14-inch, 15-inch, 16-inch, 17-inch, 18-inch, 19-inch, or 20-inch nominal diameter conduit (or comparable metric conduits 107). The conduits 107 may be larger. For example, the conduit 107 may define or include a 36-inch nominal diameter.

The nozzle assembly 101 may be fluidically coupled to a supply conduit 106, such as a hose or pipe. The supply conduit 106 may be fluidically coupled to a cleaning fluid source 105 such as a tank, spigot, water main, hydrant, etc. As discussed herein, a cleaning fluid may be any fluid (preferably a liquid, but also a gas or a mixture of a gas and liquid or a mixture of a liquid and solid, etc.) adapted to clean an interior surface of a conduit such as a pipeline, culvert, hose, or the like or a vessel such as a pressure vessel or tank. In many embodiments, the cleaning fluid may be water or an aqueous solution of water and a solvent such as a surfactant, root killer, caustic or acidic agent, abrasive material, or the like.

Figure 1B:
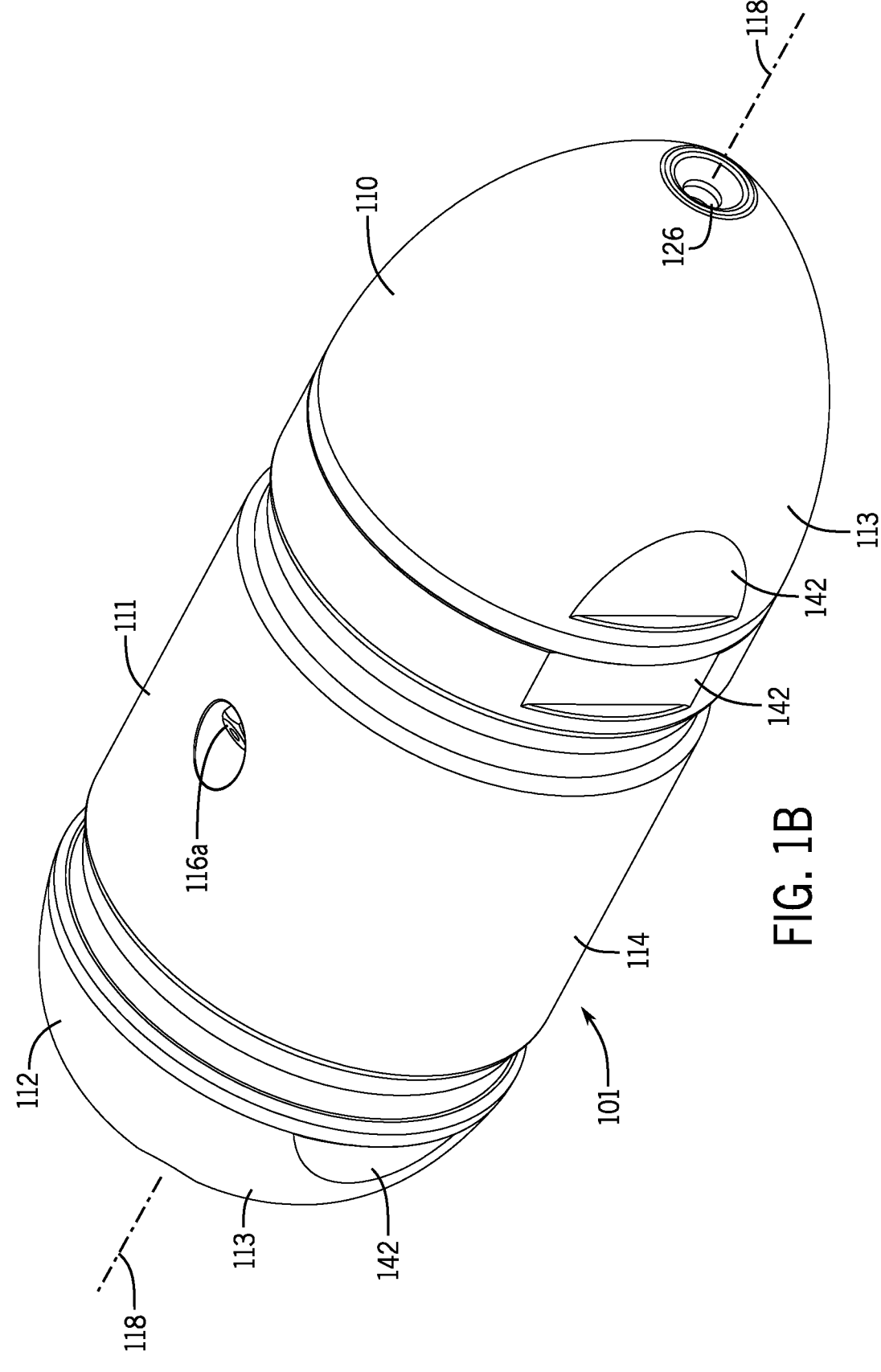
FIG. 1B is a front, right isometric view of an embodiment of a nozzle assembly.

The cleaning fluid source 105 may be fluidically coupled to a pump 104 that receives the cleaning fluid 141 from the cleaning fluid source 105 and increases a pressure of the cleaning fluid 141. Increasing the pressure of the cleaning fluid 141 may help make the cleaning fluid 141 more effective at removing the clogging material 109 from the inner surface of the conduit 107, and/or generating a desired rotational speed of the rotor 114 (FIG. 1B). In some examples, the pump 104 may increase the pressure of the cleaning fluid 141 to about 500 psi, 1000 psi, 1500 psi, 2000 psi, 2500 psi, 3000 psi, or anywhere therebetween. In some embodiments, the pump 104 may increase the pressure of the cleaning fluid 141 to pressures above 3000 psi, such as up to 20,000 psi. In some implementations, the nozzle assembly may be able to distribute the cleaning fluid 141 at a flow rate of about 1, 5, 10, 20, 30, 40, 50, 60, 70, 80, 90, or even 100 gallons per minute. For example, the nozzle assembly may distribute the cleaning fluid 141 at a flow rate of 4 gallons per minute. Flow rate may be scaled with pressure, the size of the conduit 107 to be cleaned, and/or the level of contamination of the conduit 107.

The nozzle assembly 101 be fluidly coupled to the aforementioned components and may receive the cleaning fluid 141 from the pump 104 via the supply conduit 106 and distribute the cleaning fluid 141 via one or more streams 108 within the conduit 107. The streams of cleaning fluid 141 may remove, break up, dissolve, or otherwise clean the clogging material 109 from the conduit 107.

Figure 1C:
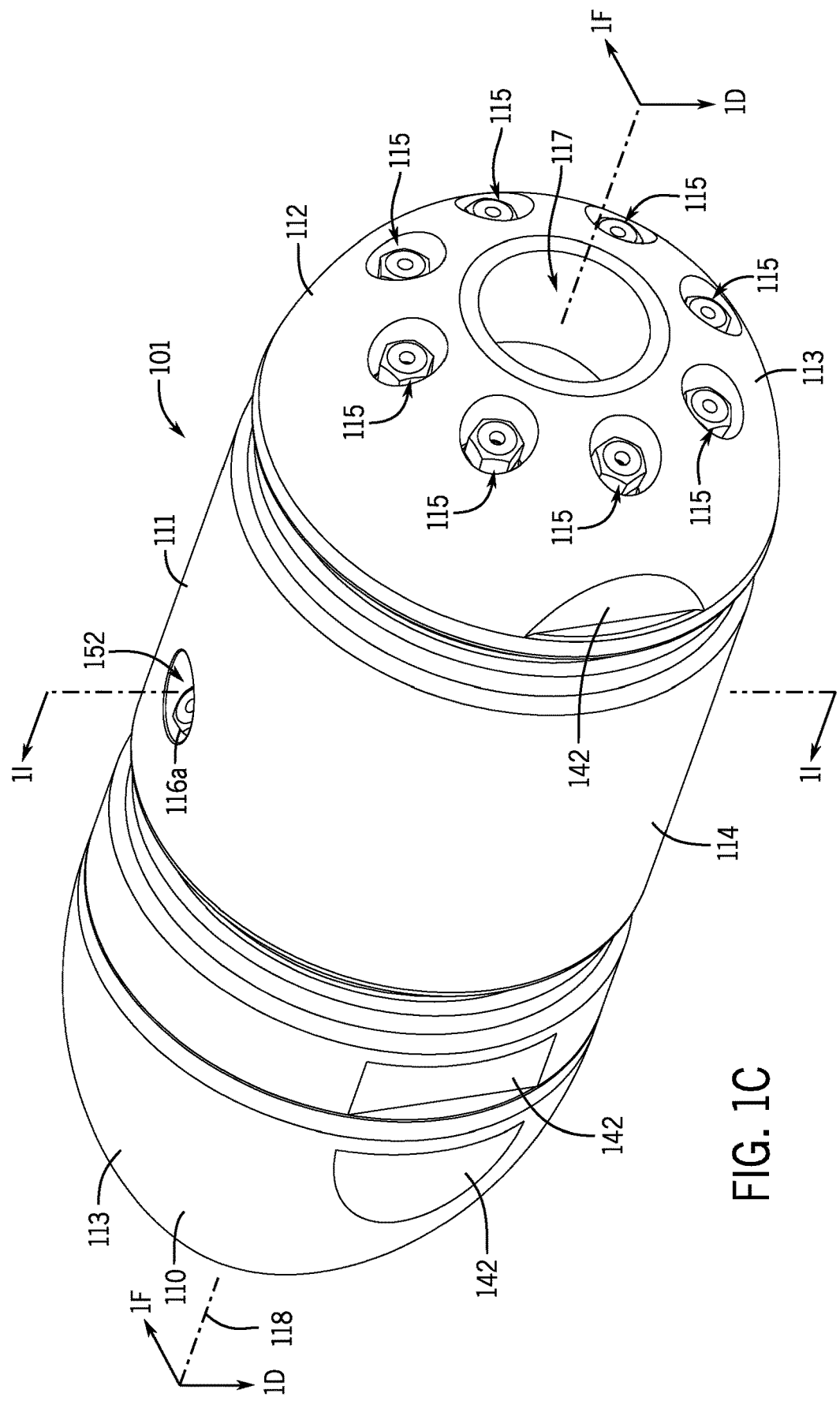
FIG. 1C is a rear, left isometric view of the nozzle assembly of FIG. 1B.

With particular reference to FIGS. 1B and 1C, the nozzle assembly 101 may include a stator 113 and a rotor 114. In the embodiment shown, the stator 113 has a front portion 110 and a rear portion 112 arranged along a longitudinal axis 118 of the nozzle assembly 101. The stator 113 may not include a front portion 110 or a rear portion 112. For example, the stator 113 may only include one of the front or rear portions 110, 112. For example, the stator 113 may include only the rear portion 112. The nozzle assembly 101 may include one or more radial axes 140 defined anywhere along the longitudinal axis 118. The rotor 114 may include or form a middle portion 111 of the nozzle assembly 101. The middle portion 111 may be disposed between the front portion 110 and the rear portion 112 along the longitudinal axis 118 (see, e.g., FIG. 1D). In other embodiments, the rotor 114 may be disposed behind the stator 113 or in front of the stator 113. In some embodiments, the stator 113 may include or form a middle portion 111 of the nozzle assembly 101 and one or more rotors 114 may form a front portion 110 and/or rear portion 112 of the nozzle assembly 101. In some embodiments, the longitudinal axis 118 defines a rotational axis of the rotor 114. E.g., the front portion 110, middle portion 111, and rear portion 112 may be aligned on a common longitudinal axis 118. Likewise, the one or more portions of the stator 113 and the rotor 114 may be aligned along a common longitudinal axis.

Figure 5:
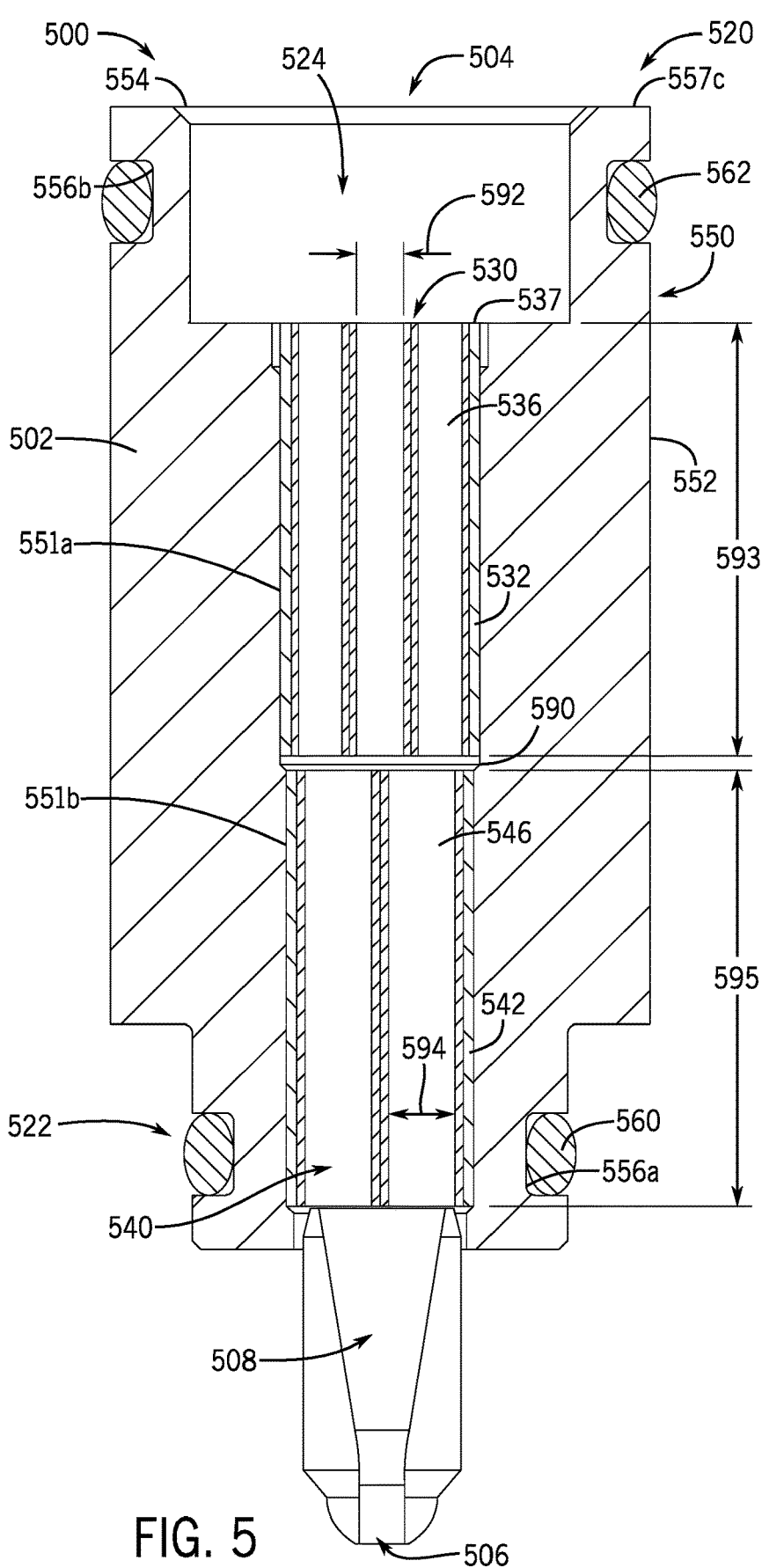
FIG. 5 is a section view of an example of a flow straightener suitable use with the nozzle assembly of FIG. 1B.

The nozzle assembly 101 may include one or more nozzles 116*a/b* and/or a rotary nozzle 126 (see, e.g., FIG. 1B, FIG. 1D, FIG. 1E), and/or one or more rear nozzles 115. Any nozzles in the nozzle assembly 101 may concentrate, straighten, accelerate, and/or direct a stream 108 of the cleaning fluid 141. For example, the nozzles may have a flow straightener assembly 500, or a converging section 508 that converts potential energy in the cleaning fluid 141 (e.g., pressure) to kinetic energy (e.g., velocity) (FIG. 5). The nozzles may generate a thrust due to the reaction force of the cleaning fluid 141 leaving the nozzle. The thrust may be substantially aligned with the flow axis of the nozzle from which a particular stream 108 emanates. The thrust may be resolved into radial, longitudinal, or other components such as to imbue the nozzle assembly 101 with certain cleaning or motion properties, such as spinning, and/or thrust.

The nozzles 116*a/b* may be disposed in, or coupled to, the rotor 114 such that as the rotor 114 spins, the one or more nozzles 116*a/b* spray the cleaning fluid 141 on the interior wall of the conduit 107, e.g., in a conical, circular or spiral pattern. Thus, the nozzle 116*a/b* may cover a substantial portion of the interior wall of the conduit 107 with the cleaning fluid 141 such as to clean the clogging material 109 from the conduit 107. In some implementations, the cleaning fluid 141 emitted from the nozzle 116*a/b* may additionally propel the nozzle assembly 101 along the conduit.

With particular reference to FIG. 1D-FIG. 5, the internal components of the nozzle assembly 101 are described in further detail. One or more components of the nozzle assembly 101 may define a distribution channel 132. The distribution channel 132 may receive the cleaning fluid 141 from the inlet 117, for example a cleaning fluid 141 provided to the nozzle assembly 101 via the supply conduit 106. The distribution channel 132 may distribute the cleaning fluid 141 to one or more portions of the nozzle assembly 101. The distribution channel 132 may be formed by one or more components of the rear portion 112, middle portion 111, and/or front portion 110. Likewise, the distribution channel 132 may be formed by one or more portions of the stator 113 or the rotor 114.

Rear Portion

The nozzle assembly 101 may include a rear housing 139 (see, e.g., FIG. 1G1) that forms at least a part of the rear portion 112 of the nozzle assembly 101. The rear housing 139 may form a portion of the stator 113. FIG. 1G shows a cross section of an example of a rear housing 139. The rear housing 139 may include a body 156, such as a rounded body with a cylindrical cross section. The rear housing 139 may include an inlet 117 configured to fluidically couple to the supply conduit 106. The inlet 117 may be formed in the body 156. For example, the inlet 117 may be a cylindrical aperture formed in the body 156. The inlet 117 receives the cleaning fluid 141 from the supply conduit 106. For example, the inlet 117 may include threads, pin lock, bayoneted mount, or another suitable mechanism to couple the rear housing 139 to the supply conduit 106 such that a substantially fluid-tight seal may be established between the rear housing 139 and the supply conduit 106. The inlet 117 and/or the distribution channel 132 may extend through all or part of the rear housing 139, e.g., through a central portion thereof.

Figure 1D:
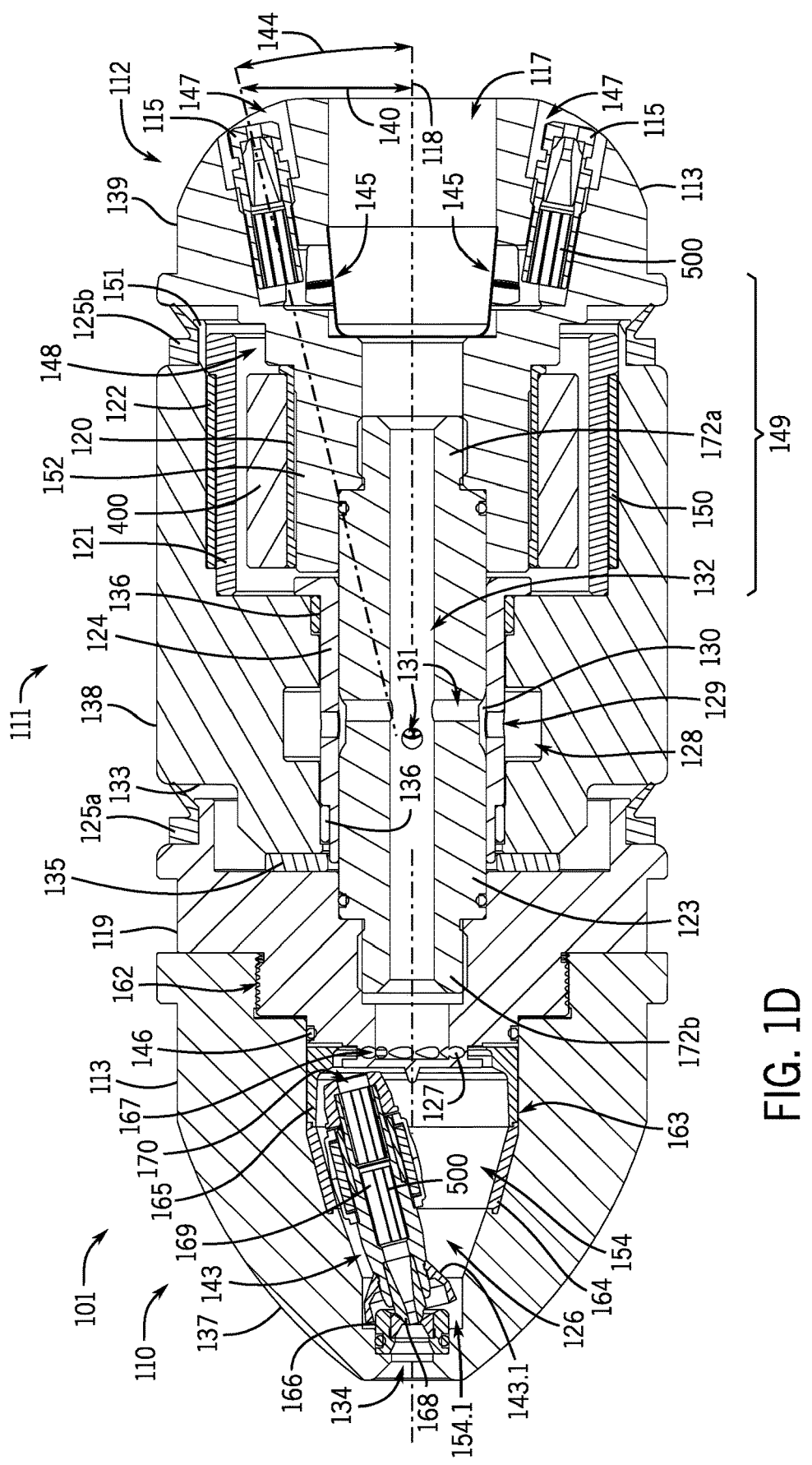
FIG. 1D is a section view of the nozzle assembly of FIG. 1B taken along line 1D-1D of FIG. 1C.

With particular reference to FIG. 1C and FIG. 1D, the nozzle assembly 101 may include one or more rear nozzles 115. The rear nozzles 115 may be disposed within the rear portion 112. The rear nozzles 115 may be disposed in the stator 113 (e.g., as shown) or in a rotor 114. The rear nozzles 115 may be disposed about the inlet 117. For example, as shown in FIG. 1D, the rear nozzles 115 may be disposed at an angle 144 with respect to the longitudinal axis 118 around the inlet 117. In some embodiments, the angle 144 may have a larger longitudinal thrust component (e.g., along the longitudinal axis 118) than radial thrust component (e.g., along a radial axis 140) than radial component. In some embodiments, the angle 144 may be about 5°, 10°, 15°, 20°, 25°, 30°, 35°, 40°, or 450 with respect to the longitudinal axis 118. The nozzle assembly 101 may be propelled or urged along the conduit 107 by the thrust of the stream 108 of cleaning fluid 141 leaving one or more rear nozzles 115, and as such, the cleaning fluid 141 exiting the rear nozzles 115 may propel the nozzle assembly along the conduit. The streams 108 from the rear nozzles may also impinge on the interior wall of the conduit 107, to help clean the conduit. In other embodiments, the rear nozzles 115 may be disposed at an angle 144 with respect to the longitudinal axis 118 such that the stream 108 leaving a particular rear nozzle 115 has a greater radial thrust component than the longitudinal thrust component. Such nozzles may be configured to for instance clean the conduit 107 but may also provide some motive thrust for the nozzle assembly 101, such as to urge the nozzle assembly 101 along the conduit 107.

The rear housing 139 may include one or more apertures 147 that provide a receptacle suitable to receive the one or more respective rear nozzles 115. For example, the rear nozzles 115 may include external threads that mate with internal threads formed in the apertures 147. As shown for example in FIG. 1D and FIG. 1G1, the one or more apertures 147 may be in fluid communication with a manifold 145. The manifold 145 may be in fluid communication with the inlet 117 and/or the distribution channel 132. Thus, a portion of the cleaning fluid 141 delivered to the nozzle assembly 101 may flow from the inlet 117, to the manifold 145, into the apertures 147 and through the one or more rear nozzles 115. The rear nozzles 115 may be at least partially recessed within the apertures 147 such as to protect the rear nozzles 115 from damage. The rear nozzles 115 may be fluidically coupled with one or more flow straightener assemblies 500 as discussed herein.

With continued reference to FIG. 1G1, the rear housing 139 may include a protrusion 152 that extends from the body 156 of the rear housing 139 in a distal direction (e.g., towards the front 110 of the nozzle assembly 101). For example, the protrusion 152 may extend from the body 156 along the longitudinal axis 118. The protrusion 152 may be substantially cylindrical. The protrusion 152 may couple to, receive, or support one or more components of the nozzle assembly 101, such as components of a braking system 149. For example, a sleeve 120 and/or magnet 400 of the braking system 149 may be received on or coupled to the protrusion 152. In many embodiments, a magnet 400 may be formed of a brittle material, and the sleeve 120 may help couple the magnet to the protrusion 152. For example, the sleeve 120 may be formed of a relatively softer, tougher, or more compliant material than the magnet 400 so as to buffer the magnet 400 from shocks, surface imperfections in the protrusion, or the like. In some implementations, the sleeve 120 may be formed of a polymer, an elastomer, a metal, or combinations of these or other materials. See, FIG. 1D. The inlet 117 and/or a portion of the distribution channel 132 may extend through the protrusion 152. For example, the distribution channel 132 may communicate fluidically with the inlet 117 via the manifold 145. Thus, the inlet 117, the manifold 145, and the distribution channel 132 may form a passage or conduit through the rear housing 139. A boss 155 may be formed on the inner surface of the distribution channel 132 and may be configured to receive one or more portions of the nozzle assembly 101, such as a shaft 123 discussed in further detail herein. The rear housing may include one or more facets 142 (FIGS. 1C and 1G2). For instance, the rear housing 139' of FIG. 1G2 may include a facet 142 configured as a hexagonal nut defining the inlet 117 or have another configuration providing an interface for a hex/Allen drive and/or other tool interface. The rear housing 139' may additionally include another facet 142 at a sidewall for providing an interface for wrench or vice such as for assembly, dis-assembly, maintenance, inspection, assembly with other rotating assemblies (e.g., the sleeve 124, shaft 123, and thrust bearing 135), or the like, as well as attachment with other components via a fastener configured to be received by a through hole of the facet 142. The rear housing 139' of FIG. 1G2 may otherwise include the same structures and operate in the same manner as the rear housing 139, and a detailed description of the rear housing 139' will not be repeated in the interest of brevity.

Middle Portion

Figure 1E:
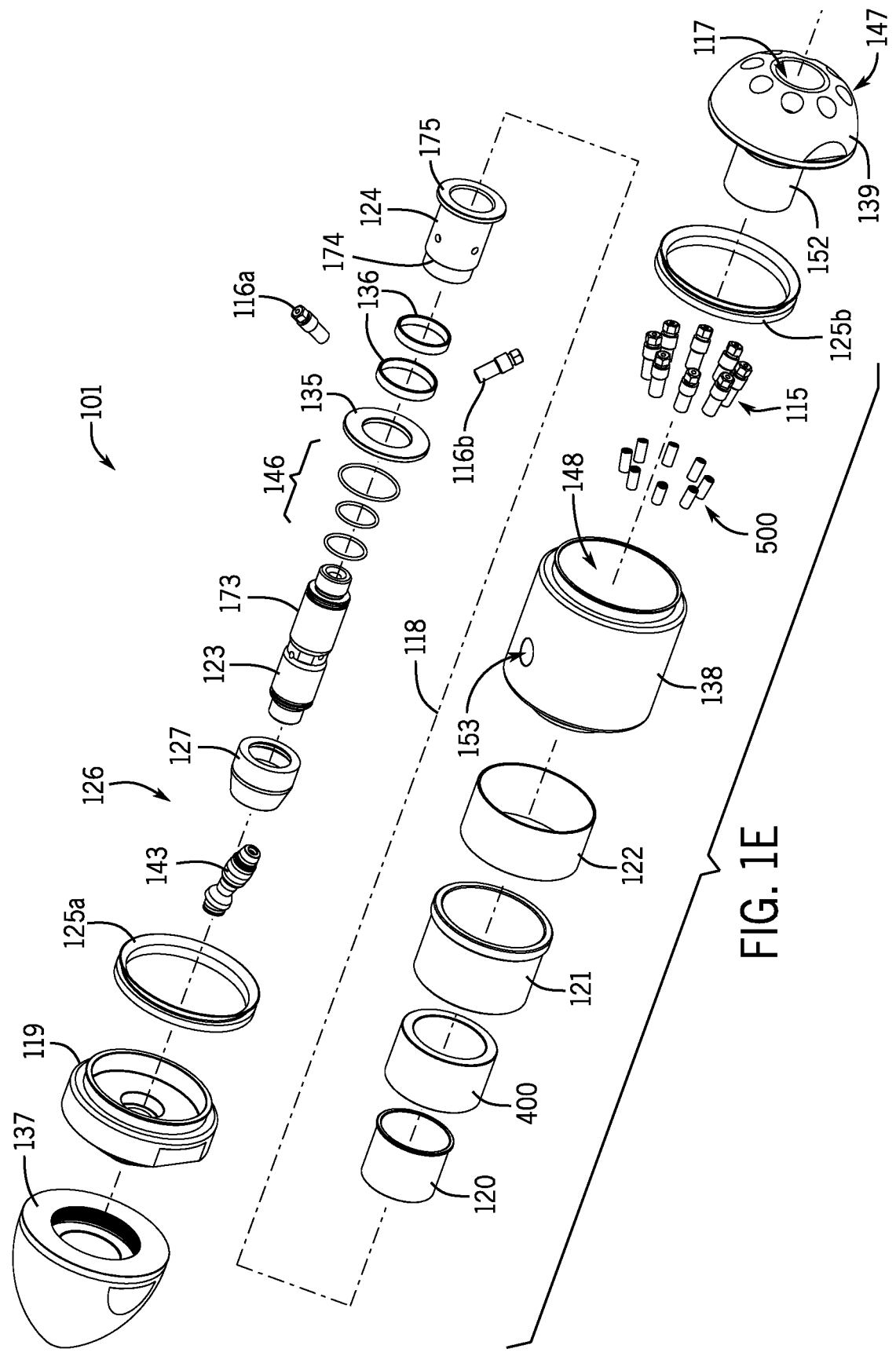
FIG. 1E is a partial exploded view of the nozzle assembly of FIG. 1B.
Figure 1F:
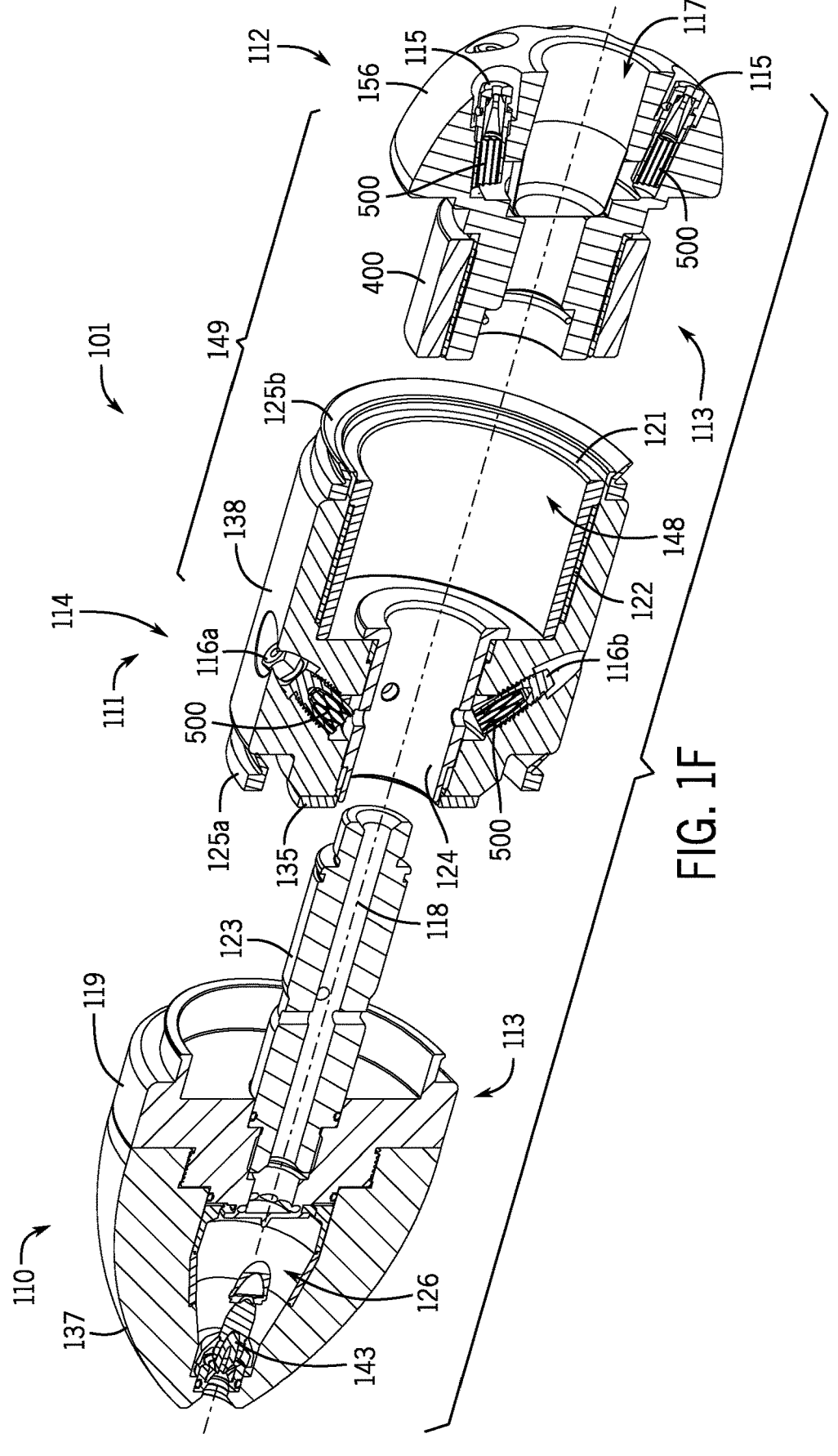
FIG. 1F is a partial exploded section view of the nozzle assembly of FIG. 1B taken along line 1D-1D of FIG. 1C.
Figure 1H:
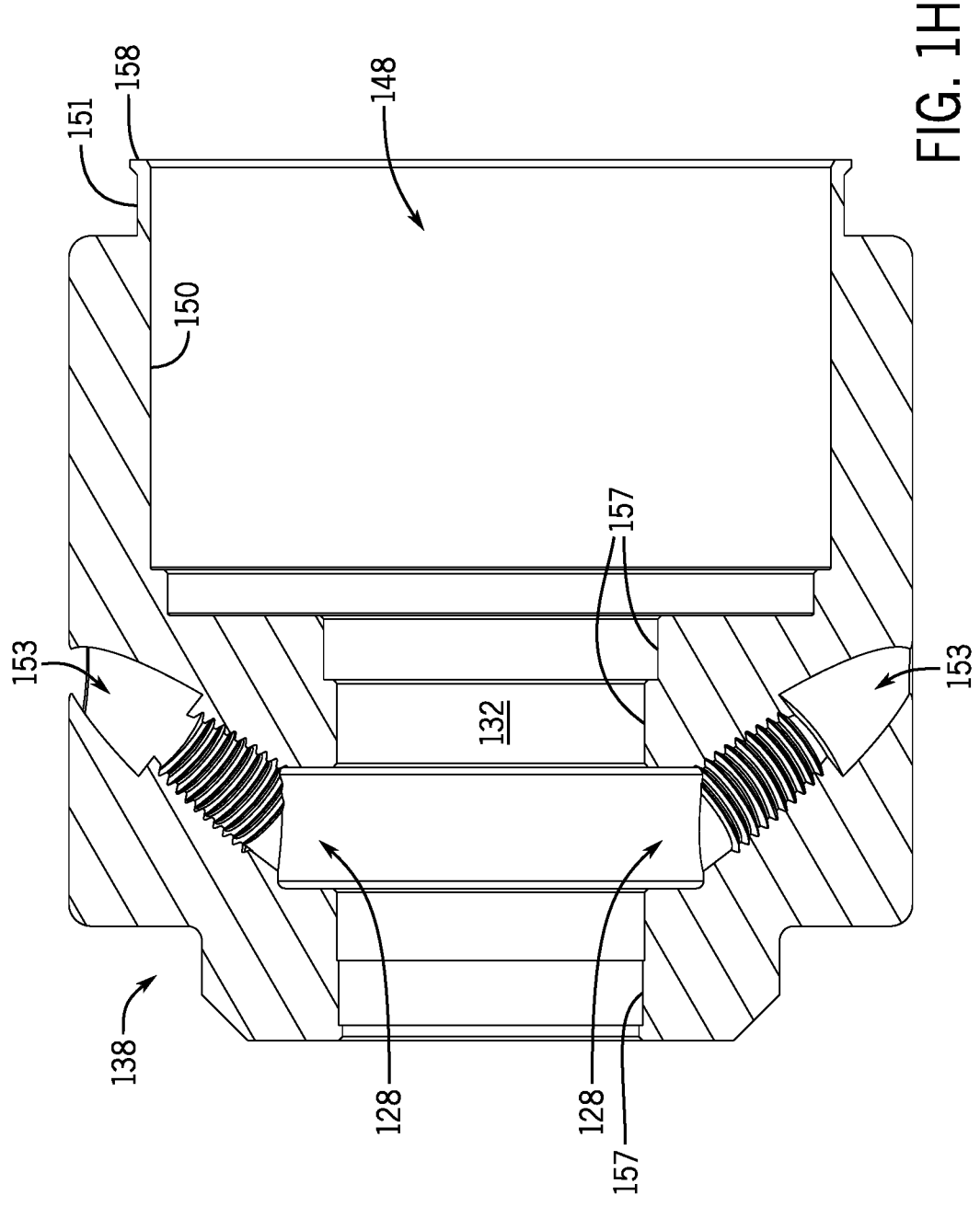
FIG. 1H is a section view of an example of a middle housing of the nozzle assembly of FIG. 1B taken along line 1F-1F of FIG. 1C.

With reference to FIG. 1D, FIG. 1F, and FIG. 1H, the nozzle assembly 101 may include a middle housing 138 that forms an outer portion of the middle portion 111 of the nozzle assembly 101. A cross section of an example of a middle housing 138 is shown in FIG. 1H. The middle housing 138 may form a portion of the rotor 114. For example, the middle housing 138 may be an outer portion of the rotor 114. The middle housing 138 may be a substantially cylindrical body with an aperture 148 formed therein. The aperture 148 may be suitable to receive one or more other portions of the nozzle assembly 101, such as portions of the braking system 149. For example, the aperture 148 may have an inner wall 150 configured to receive one or more components of the braking system 149. The aperture 148 may also receive portions of the braking system 149 that are not in physical contact with the middle portion 111, such as the magnet 400 which may be physically coupled to the protrusion 152 of the rear housing 139. For example, in the assembled nozzle assembly 101, the magnet 400 may be received within the aperture 148 but may not be in contact with the inner wall 150. A flange 151 may extend longitudinally from an end portion of the cylindrical body of the middle housing 138. A lip 158 may protrude radially outward from the flange at a location along the flange 151, for example, at an end portion of the flange 151.

The middle housing 138 may form a portion of the distribution channel 132. For example, the middle portion 111 may have one or more bosses 157 formed on an inner surface of the aperture 148 thereof that receive the shaft 123 and/or one or more bushings 136 or O-rings. See, e.g., FIG. 1D. The shaft 123 may be rotationally coupled to the middle housing 138. As such, the shaft 123 may form a portion of the stator 113, particularly a coupling portion that joins the rear portion 112 and the front portion 110 of the stator 113. A manifold 128 may be formed in the middle housing 138. The manifold 128 may be in fluid communication with the distribution channel 132. One or more apertures 153 may extend from the manifold 128 to an exterior surface of the middle housing 138. The manifold 128 may supply a portion of the cleaning fluid 141 to the one or more nozzles 116*a/b* via the apertures 153. The apertures 153 may include internal threads that threadedly selectively couple to external threads on the nozzles 116*a/b*.

Figure 1I:
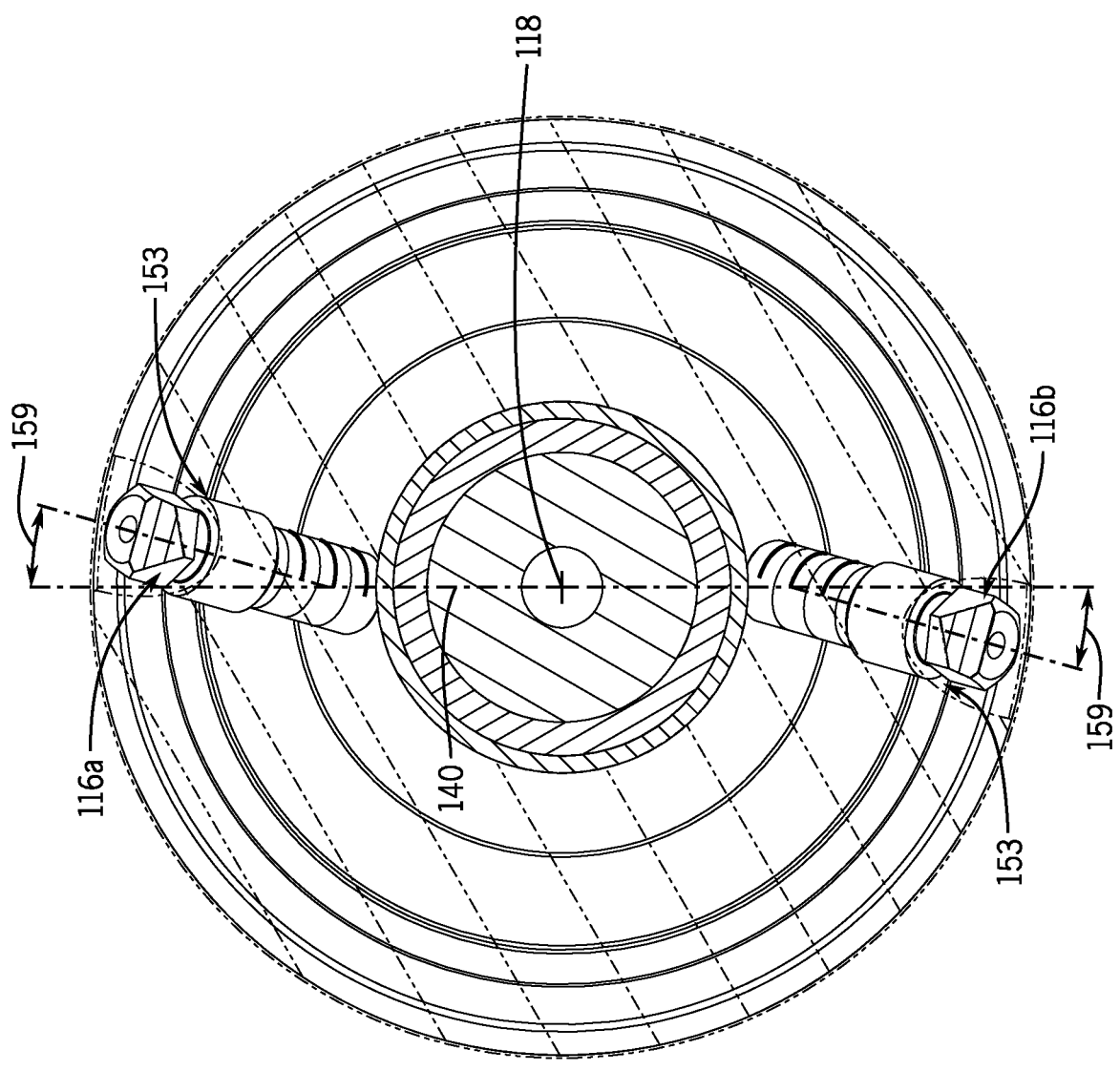
FIG. 1I is a section view of the nozzle assembly of FIG. 1B taken along line 1I-1I of FIG. 1C.
Figure 1J:
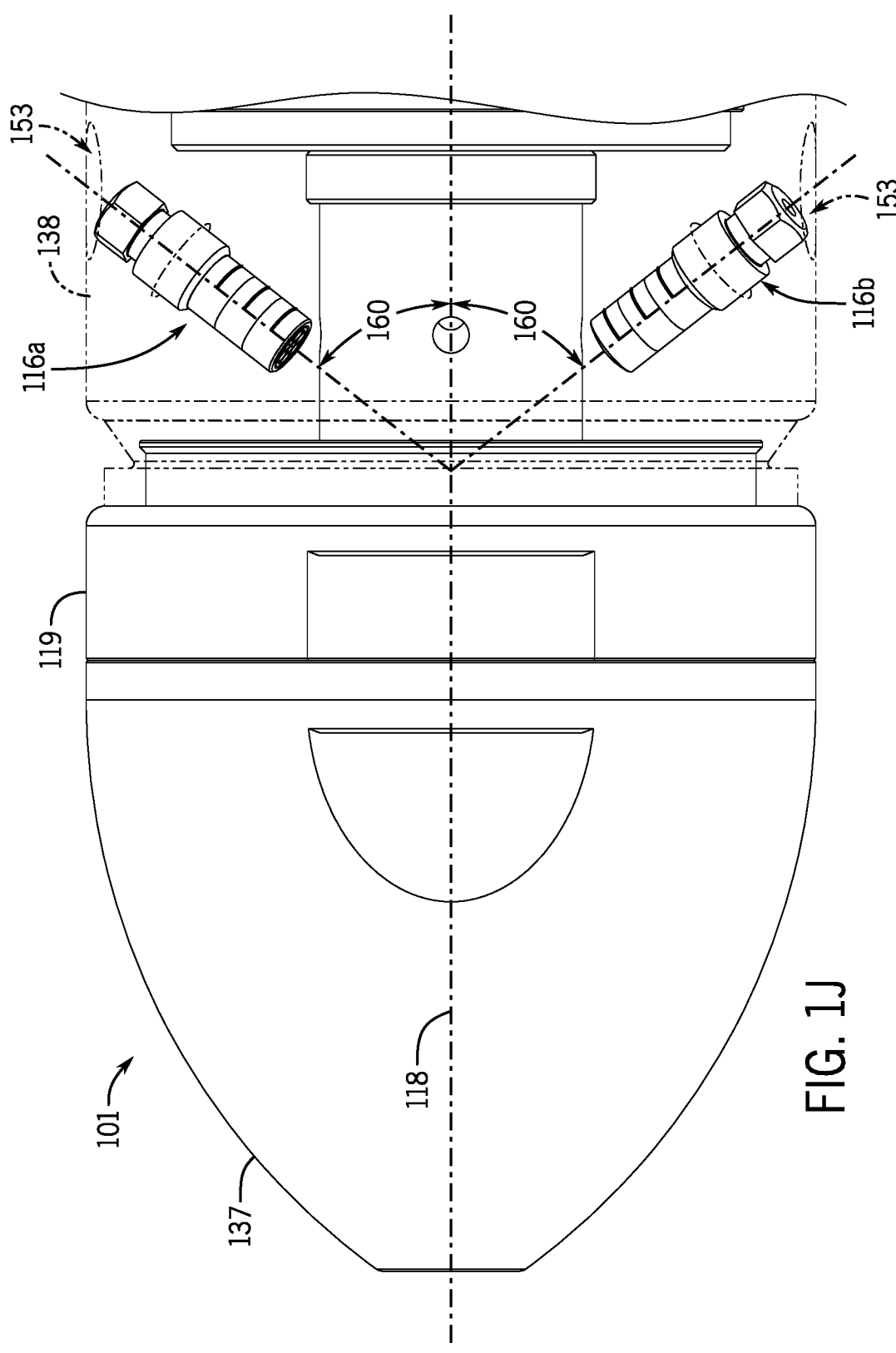
FIG. 1J is a partial elevation view of the nozzle assembly of FIG. 1B with some components hidden or shown transparent.
Figure 1K:
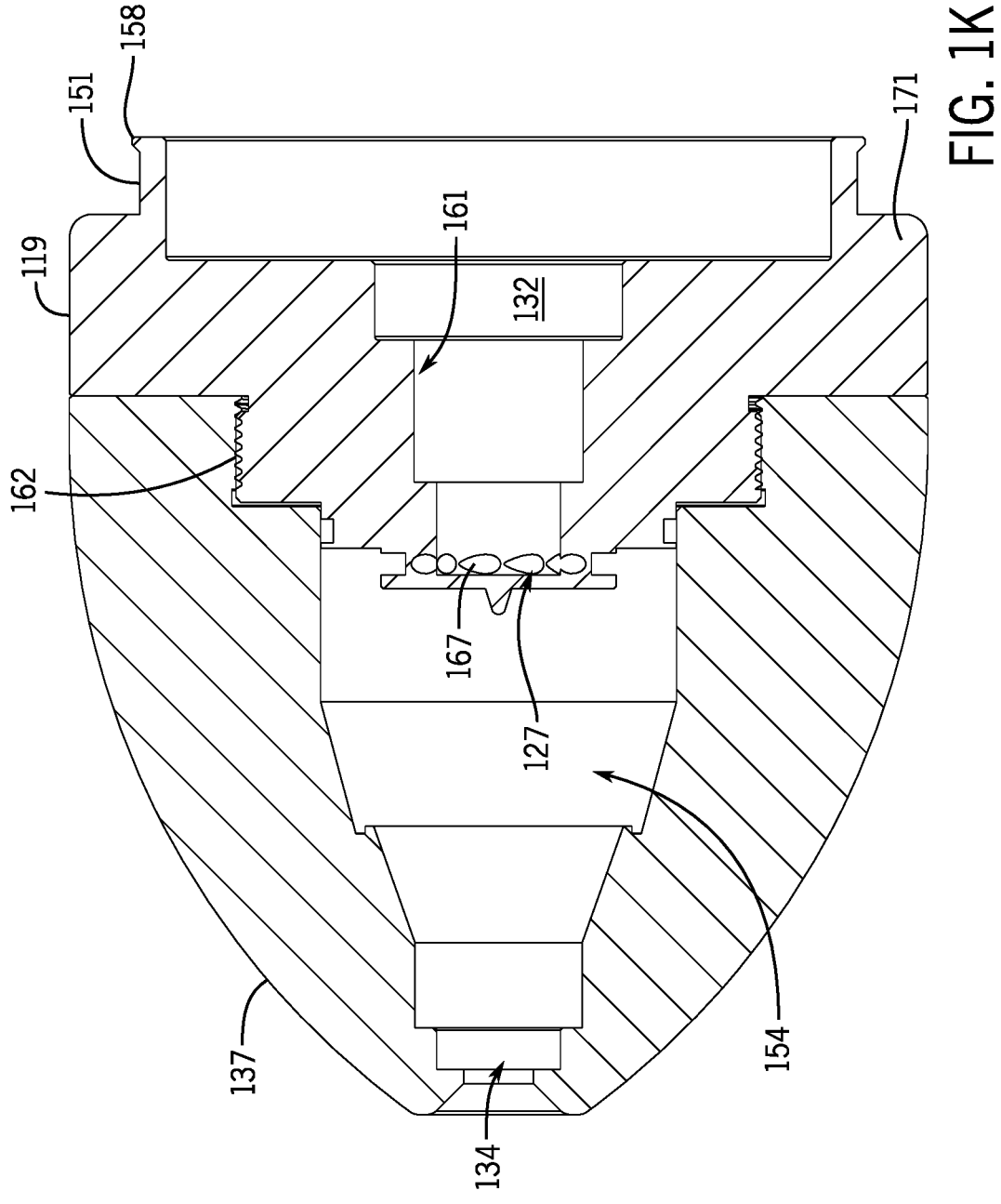
FIG. 1K is a section view of an example of a front housing and nose of the nozzle assembly of FIG. 1B taken along line 1D-1D of FIG. 1C.
Figures 2A, 2B:
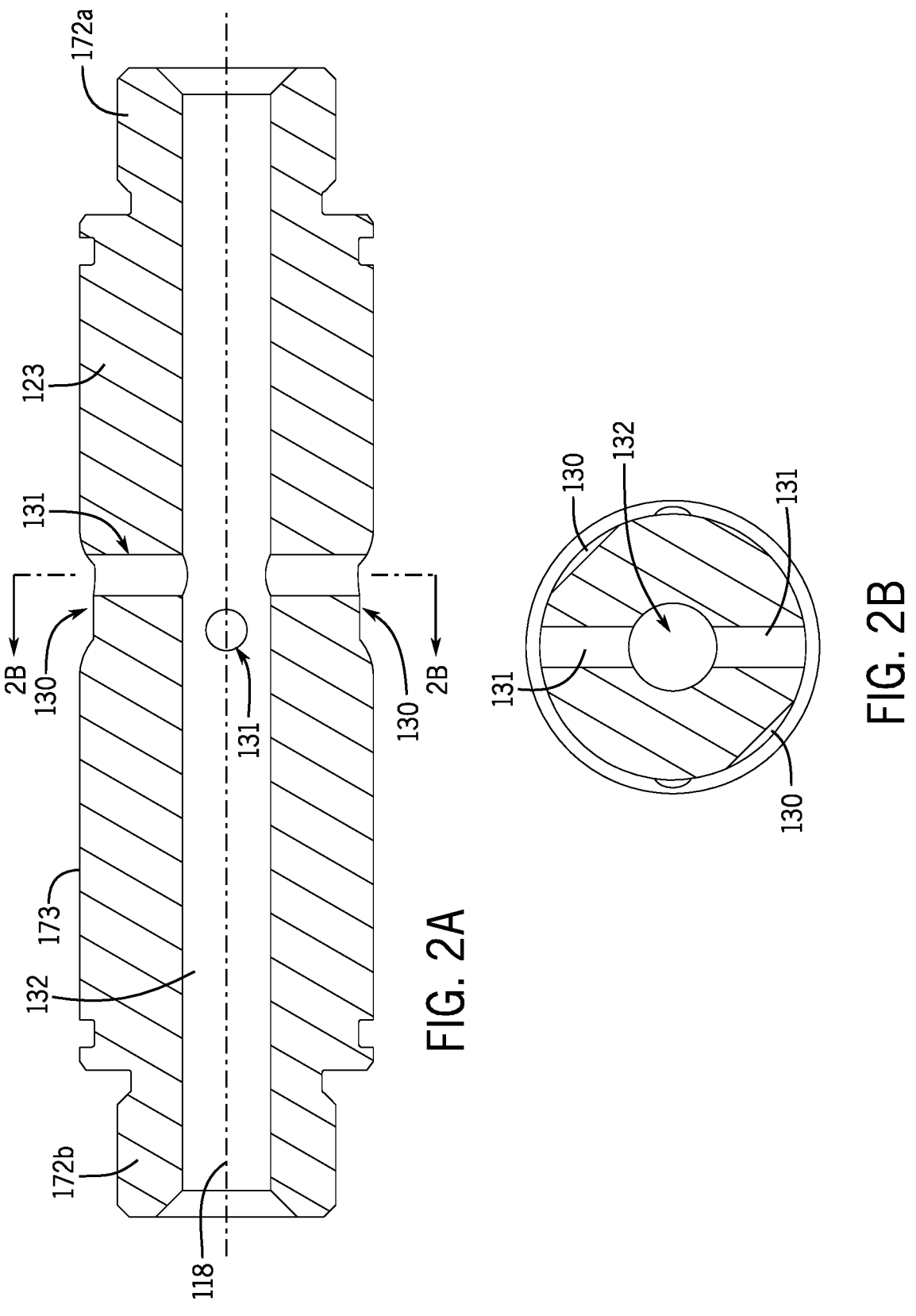
FIG. 2A is a section view of an example of a shaft of the nozzle assembly of FIG. 1B.
FIG. 2B is a section view of the shaft of the nozzle assembly of FIG. 2A, taken along line 2B-2B of FIG. 2A.

With particular reference to FIG. 1I and FIG. 1J, the apertures 153 may be disposed in the middle housing 138 such that the nozzles 116*a/b* are positioned at a compound angle with respect to the longitudinal axis 118 and/or one or more radial axes 140. The compound angle may be formed by disposing the nozzles 116*a/b* at both a radial angle 159 with respect to a radial axis 140 and also at a longitudinal angle 160 with respect to the longitudinal axis 118.

For example, as shown in FIG. 1I, the nozzles 116*a/b* may be disposed at a radial angle 159 with respect to a radial axis 140. The radial angle 159 may be selected to achieve a desired rotational speed of the rotor 114 at a given pressure of the cleaning fluid 141. For example, higher values of the radial angle 159 may cause the stream 108 of cleaning fluid 141 leaving the nozzle 116*a/b* to have a relatively larger radial component of thrust and thus cause the rotor to spin relatively faster at a given pressure than if a smaller radial angle 159 is used. In some embodiments, the radial angle 159 is about 16°. However, in other embodiments, the radial angle 159 may be 1, 2, 3, 4, 5, 6, 7, 8, 9, 10, 11, 12, 13, 14, 15, 16, 17, 19, 19, 20, 21, 22, 23, 24, 25, 26, 27, 28, 29, 30, 31, 32, 33, 34, 35, 36, 37, 38, 39, 40, 41, 42, 43, 44, or 45 degrees. The radial angle 159 may be any fraction or decimal portion of an angle between 0 and 45°.

As shown for example, in FIG. 1J, the nozzles 116*a/b* may be disposed at a longitudinal angle 160 with respect to the longitudinal axis 118. In some embodiments, the longitudinal angle 160 may be about 52°. In some implementations, the angle 160 may be about 1, 2, 3, 4, 5, 6, 7, 8, 9, 10, 11, 12, 13, 14, 15, 16, 17, 19, 19, 20, 21, 22, 23, 24, 25, 26, 27, 28, 29, 30, 31, 32, 33, 34, 35, 36, 37, 38, 39, 40, 41, 42, 43, 44, 45 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90 degrees or fractions thereof. The longitudinal angle 160 may be selected to provide a desired longitudinal thrust to the nozzle assembly 101 from the streams 108 leaving the respective nozzles 116*a/b*. The longitudinal angle 160 may also be selected to provide a desired impingement of the stream 108 on the inner surface of the conduit 107, such as to clean the conduit 107.

Turning back to FIG. 1D, the nozzle assembly 101 may include a seal 125*b* that seals a joint between the rear portion 112 and the middle portion 111 against fluid leakage (either or both ingress or egress) with respect to the middle portion 111. For example, the seal 125*b* may be a lip seal, o-ring, or other device that maintains a substantially fluid-tight seal either when the stator 113 and rotor 114 rotate with respect to one another and also when they have no relative movement. The seal 125*b* may be coupled to either the rear housing 139 or, as shown, to the middle housing 138, such as over the flange 151. For example, the seal 125*b* may seal against a face 133 of the rear housing 139. The seal 125*b* may be elastically stretched over the lip 158 of the flange 151 and snap back to seal against the flange 151. Thus, the seal 125*b* may be easily replaceable, such as after reaching an end of an acceptable wear life.

Front Portion

The nozzle assembly 101 may include a front portion 110. The front portion 110 may form a portion of the stator 113. The front portion 110 may include a front housing 119 and/or a nose 137. See, e.g., FIG. 1K. The front housing 119 may have a disc-like body 171 that couples to the nose 137, e.g., via a threaded engagement mechanism 162 as described in further detail herein. The nose 137 may be substantially conical or tapered, such as to help guide the nozzle assembly 101 through the conduit 107. The nose 137 may include a flow chamber 154 formed therein and in fluid communication with the distribution channel 132. The portion of the distribution channel 132 disposed in the front housing 119 may include a boss 161 configured to receive one or more portions of the nozzle assembly 101, such as the shaft 123.

A seal 125*a* similar to the seal 125*b* may be coupled to the front housing 119 (e.g., via a flange 151 and lip 158 similar to those on the middle housing 138). Similar to the seal 125*b*, the seal 125*a* may substantially prevent fluid ingress or egress in or from the nozzle assembly 101 while providing for the relative rotation of the stator 113 and the rotor 114.

As discussed herein, the shaft 123 may form a portion of the stator 113. For example, a first end portion 172*a/b* of the shaft 123 may be received in the boss 155 formed in the rear housing 139. An opposite end portion 172*a/b* of the shaft 123 may be received in the boss 161 formed in the front housing 119. Thus, the shaft 123 may form a coupling portion that couples the front portion 110 and the rear portion 112 of the nozzle assembly 101. For example, the shaft 123 may couple the front portion 110 and the rear portion 112 of the stator 113, while passing through the rotor 114, such that the rotor 114 may be disposed between the front portion 110 and rear portion 112 and may spin with respect to the front and rear portions of the stator.

The front portion 110 may, or may not, be unitarily formed with the rear portion 112. For example a front portion 110 or a rear portion 112 may be swapped out for other respective portions either for maintenance purposes, or to install other front portions 110 or rear portions 112 with different nozzle configuration or other features suited for other purposes. Additionally, or alternately, the middle portion 111 may be swapped out to form a different type of rotor 114 with different types or numbers of nozzle 116*a/b* or with nozzles oriented at different angles.

The nozzle assembly 101 may include a thrust bearing 135 disposed between the rotor 114 and the front portion 110, e.g., between the front housing 119 and the middle housing 138. The thrust bearing 135 may be formed of a material that can withstand thrust and/or propelling forces generated by the nozzle 116*a/b* and/or rear nozzles 115 and also the relative motion of the rotor 114 with respect to the stator 113. In some examples, the thrust bearing 135 may be an annular disc disposed between the middle portion 111 and the front housing 119. The thrust bearing 135 may be formed of a metal material such as bronze, brass, lead, or the like, or an elastomeric or polymer material such as poly ethylene, specifically ultra-high molecular weight polyethylene.

With reference to FIG. 1D, the front portion 110 of the nozzle assembly 101 may include a rotary nozzle 126. The rotary nozzle 126 may be as described in U.S. Pat. No. 8,500,042 owned by the applicant and incorporated by reference herein for all purposes. The rotary nozzle 126 may include a rotating element 143. The rotary nozzle 126 may include an inlet member 127 with one or more tangential discharge channels 167 that generate a vortex flow. The vortex flow may cause the rotating element 143 to rotate or nutate within a flow chamber 154 formed in the nose 137. The rotating element 143 may include a rotary nozzle 126 that directs the flow of the cleaning fluid 141 out of an outlet aperture 134. Thus, the rotary nozzle 126 may provide a rotating (e.g., conical or spiral) stream of the cleaning fluid 141. The cleaning fluid 141 may be directed at a clogging material 109 or an internal surface of the conduit 107.

A configurable rotary nozzle 126 of the present disclosure provides additional functionality to rotary spray designs. Generally, the configurable rotary nozzle 126 may include the inlet member 127, a front housing 119, an internal inner shell member 165, a nose 137 and/or a cover, one or more of which may be optional. The inlet member 127 may be formed with the front housing 119 and in fluid communication with the distribution channel 132. The inlet member 127 is generally formed of a metal or metal alloy such as, for example, aluminum, brass, stainless steel and the like so as to provide strength and durability for cleaning operations. The inlet member 127 may generate a vortex flow of the cleaning fluid 141. The vortex flow may have a substantial velocity component at an angle to the longitudinal axis 118 (e.g., tangent to the longitudinal axis 118). Alternately, the inlet member 127 can be a separate piece from the front housing 119 positioned in an inlet bore 163 and secured by the coupling of the front housing 119 and the nose 137. The front housing 119 and nose 137 may be formed of a metal or metal alloy such as, for example, aluminum, brass, stainless steel and the like.

In some embodiments, the configurable rotary nozzle 126 can include a threaded engagement mechanism 162 as shown in FIG. 1D such as, for example, an external thread on the front housing 119 configured to engage an internal thread on the nose 137 so as to form a joined outer shell of the first rear portion 112. In addition to threaded engagement, the front housing 119 and nose 137 can be engaged using any suitable connection including, for example, quick connections including compression or twist style engagement mechanisms, z-thread or quarter turn engagement mechanisms, snap detent mechanisms, and the like.

The inner shell member 165 may be retained within the nose 137, a seal 146 may be captured and compressed between the sealing surfaces of the front housing 119 and nose 137, so as to provide a substantially fluid tight seal and prevent migration of the cleaning fluid 141 into the front portion 110. The seal 146 can include an o-ring style configuration formed of a polymer selected for compatibility with the cleaning fluid 141. When retained within the front portion 110, the inner shell member 165 may define an internal wall profile of a flow chamber 154. The inner shell member 165 may be generally molded of suitable polymeric materials. The front portion 110 generally provides environmental protection to the internal components while axially and diametrically reinforcing the configurable rotary nozzle 126, and the inner shell member 165 specifically. With this reinforcement, moldable polymeric materials that would otherwise be prone to damage or other failures can be utilized as the molding operation allows for the formation of complex flow geometries integral to the internal wet components that would be otherwise impossible or economically unfeasible to accomplish.

The internal components of the configurable rotary spray nozzle 200 can further include a rotating element 143, a sleeve 164, and a seat 166 residing with the inner shell member 165. The sleeve 164 may include an elastomeric material and provides for an increased life span and surface area for engagement with the rotating element 143 when compared to seals such as o-rings. The sleeve 164 can be specially configured using desired materials or sizes to control the level of frictional engagement with the rotating element 143. The sleeve 164 is sized so as to be removably mountable within the flow chamber 154. The seat 166 is preferably press-fit into the nose 137 such that the seat 166 remains properly positioned and retained during operation.

The configurable rotary nozzle 126 may function by allowing a cleaning fluid 141 to enter through the inlet member 127. Tangential discharge channels 167 within the inlet member 127 direct the cleaning fluid 141 in a tangential direction to the incoming flow such that the fluid is directed against the internal wall profile of the flow chamber 154 causing the rotating element 143 to spin or nutate inside the flow chamber 154 as illustrated generally in FIG. 1D. As the rotating element 143 spins, the cleaning fluid 141 fluid enters a rotating element 143 inlet 170, flows through a rotating element 143 lumen 169, which may include a flow straightener assembly 500 or components thereof as provided herein, and exits a rotating element 143 outlet 168. The rotating element 143 outlet 168 typically includes a flow restriction resulting in acceleration of the fluid velocity to provide enhanced spray characteristics. At the outlet 168, the rotating element 143 may spin about the seat 166 such that the fluid is sprayed from the configurable rotary nozzle 126 in a substantially conical, circular or spiral pattern. As the rotating element 143 spins, a contact portion of rotating element 143 may engage sleeve 164 that provides friction to slow the spinning velocity of the rotating element 143 such that the fluid exiting the outlet 168 maintains a substantially continuous stream. A rotor skirt 143.1 of the rotating element 143 may be disposed proximate the outlet 168 and surround a distal portion of the rotating element 143 around the longitudinal axis thereof. The rotor skirt 143.1 may be configured to engage in a rotor skirt relief channel 154.1.1 of the flow chamber 154. While in the flow chamber 154, the cleaning fluid 141 forces the rotor skirt 143.1 of the rotating element 143 in a distal or angled distal direction resulting in forcing the outlet 168 of the rotating element 143 against the seat 166, which may create a water-tight seal. The rotor skirt relief channel 154.1 of the flow chamber 154 provides relief to the rotor skirt 143.1 enabling the rotor skirt 143.1 to move and rotate within the flow chamber 154, while forcing the outlet 168 of the rotating element 143 against the seat 166. As a result of the force exerted on the rotor skirt 143.1, the outlet 168 is forced and seals against the rotor seat 115 to cause the fluid to exit the nozzle 100 through the outlet aperture 134. Inclusion of the rotor skirt 143.1 may thus facilitate creation of the water-tight seal between the rotating element 143 and the seat 166 to prevent water from bypassing the rotating element 143 and escaping front portion 110 before passage through the lumen 169 (e.g., blow-by may prevented), particularly at lower operational pressures compared to similar nozzles without the rotor skirt. Further, the rotor skirt 143.1 may shield and prevent cleaning fluid 141 from reaching the outlet aperture 134 of the front portion 110 (e.g., preventing blow-by) such that the cleaning fluid 141 moves within the flow chamber 154 and reaches the rotating element inlet 170 for its eventual discharge through the outlet aperture 134.

In some implementations, the outlet aperture 134 may be covered or sealed with a removable cap such that fluid instead exits other nozzle outlets as provided herein. In other implementations, the front portion 110 may be free of an outlet aperture 134 and a rotating element 143, such that fluid instead exits outlets provided herein.

Shaft and Sleeve

With reference to FIG. 1D, FIG. 2A, FIG. 2B, and FIG. 3. The nozzle assembly 101 may include a shaft 123 adapted to mechanically and fluidly couple the front portion 110 to the rear portion 112. The shaft 123 may have a substantially cylindrical external face 173. For example, as shown in FIG.

1D, respective opposite end portions 172a/b of the shaft 123 may be received in the boss 155 and the boss 161 formed in the rear housing 139 and the front housing 119, respectively. For example, the end portions of the shaft 123 may be threaded or keyed to their respective bosses 155. A portion of the distribution channel 132 may extend through the shaft 123, such as through a central portion thereof. For example, the shaft 123 may have a longitudinal aperture running between the end portion 172a and the end portion 172b that forms a portion of the distribution channel 132. One or more branches 131 may extend (e.g., radially) through the shaft 123 and in fluid communication with the distribution channel 132. The external face 173 of the shaft 123 may have one or more manifolds 130 formed therein, such as via a depression or groove disposed radially inward from the external face 173 toward the longitudinal axis 118. The branches 131 and the manifold 130 may provide fluid couplings that serve to distribute a portion of the cleaning fluid 141 to the nozzle 116a/b, as discussed herein.

Figure 3:
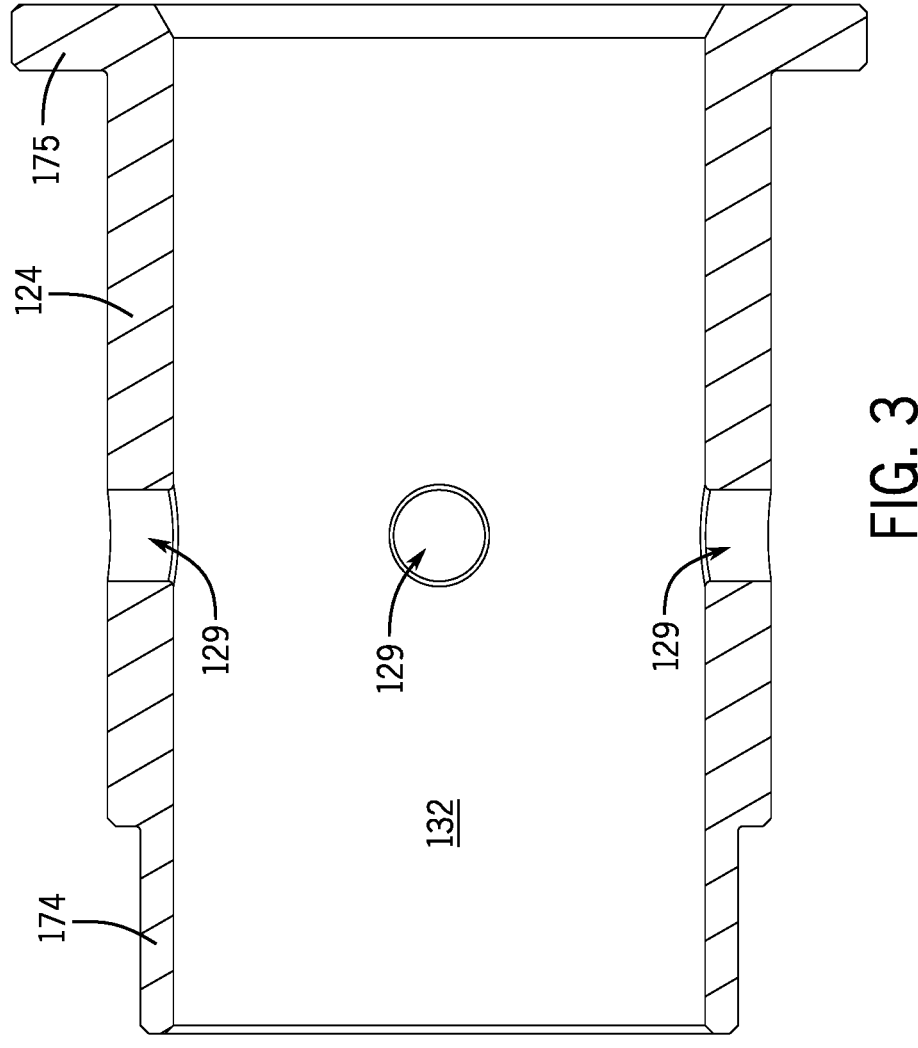
FIG. 3 is a section view of an example of a sleeve of the nozzle assembly of FIG. 1B.
Figure 4B:
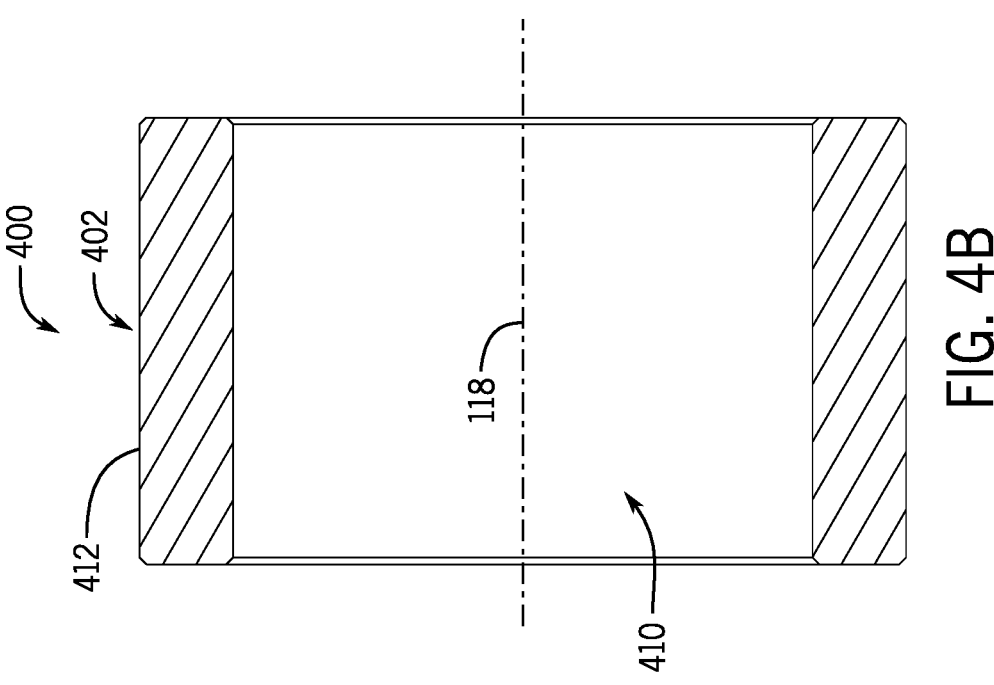
FIG. 4B is a section view of the magnet of FIG. 4A taken along section line 4B-4B of FIG. 4A.
Figure 4A:
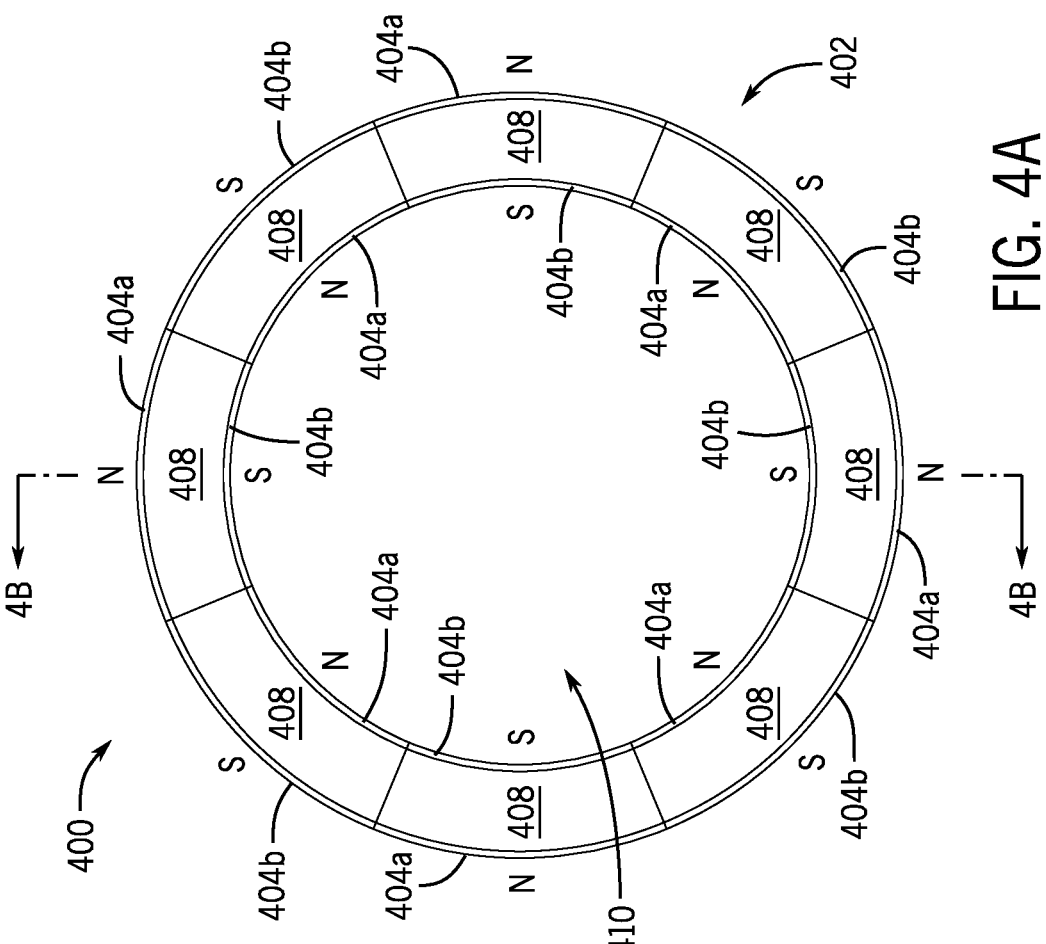
FIG. 4A is an elevation view of an example of a magnet of the nozzle assembly of FIG. 1B.

As shown for example in FIG. 1D and FIG. 3, the nozzle assembly 101 may include a sleeve 124 that forms a portion of the distribution channel 132. The sleeve 124 may have a substantially cylindrical body. The sleeve 124 may generally be larger in a radial dimension than the shaft 123 such that the shaft 123 may be received in the sleeve 124. The sleeve 124 may include one or more apertures 129 that extend radially from the distribution channel 132 to an external face of the sleeve 124 for fluid coupling to the middle portion 111. The sleeve 124 may include a flange 175 that extends radially from the body. The sleeve 124 may include a neck 174 that extends along the longitudinal axis 118 and has a smaller radial dimension than the flange 175 or the body.

Braking System

With reference to FIG. 1D, FIG. 1E, FIG. 1F, FIG. 4A and FIG. 4B, the nozzle assembly 101 may include a magnetic braking system 149. The braking system 149 may include at least one magnet 400. The magnet 400 may be formed of a body 402, such as a substantially cylindrical body 402. However, the body 402 of the magnet 400 may be any shape. For example, the body 402 may be any shape that functions with the nozzle assembly 101. The body 402 may have a relatively thin wall 412 that defines a relatively larger aperture 410, such as in a central portion of the body 402. The wall 412 may include one or more polarized portions, such as the radially polarized portions 408. In the example shown, the magnet 400 includes eight radially polarized portions 408. In other embodiments, the magnet 400 may include more or fewer radially polarized portions 408, such as 2, 4, 6, 10, 12, 14, 16, 18, and so on. In other embodiments, the magnet 400 may be polarized other than radially, such as longitudinally. In other embodiments, still, more than one magnet 400 may be used, e.g., each radially polarized portion 408 may be a separate body 402.

The radially polarized portions 408 may each be formed of oppositely polarized magnetic poles 404a/b, such as north or south poles that generate a magnetic field. The radially polarized portions 408 may be interleaved with one another with oppositely-polarized magnetic poles 404a/b arranged adjacent to one another in the body 402.

For example, a first radially polarized portion 408 of the plurality of radially polarized portions includes a first magnetic pole 404a having a first magnetic polarity (e.g., N or North) and a second magnetic pole 404b having a second magnetic polarity (e.g., S or South) opposite the first magnetic polarity, and the first pole is disposed closer (e.g., radially closer) to the longitudinal axis than the second pole. A second radially polarized portion of the plurality of radially polarized portions may include a third pole having the first magnetic polarity (e.g., N) and a fourth pole having the second magnetic polarity (e.g., S), where the fourth pole is disposed closer (e.g., radially closer) to the longitudinal axis than the third pole.

In some implementations, polarized magnetic poles 404a may be arranged in an alternating fashion with oppositely polarized magnetic poles 404b around an external circumference of the magnet 400. In some implementations, polarized magnetic poles 404a may be arranged in an alternating fashion with oppositely polarized magnetic poles 404b around an internal circumference of the magnet 400.

The braking system 149 may include a conductor 121 (best shown in FIG. 1E). The conductor 121 may be any material that can conduct an electrical current, such as a ferrous or non-ferrous metal such as brass, aluminum, copper, steel, lead, titanium, alloys of these, or the like. The conductor 121 may be formed of a substantially cylindrical body and may include an aperture formed therein that is configured to receive at least a portion of the magnet 400. As such, the body of the conductor 121 may be any shape that functions to receive at least the portion of the magnet 400.

The braking system 149 may include a shield 122. The shield 122 may be formed of a substantially cylindrical body with a central aperture formed therein and suitable to receive at least a portion of the conductor 121. The shield 122 may be any ferromagnetic material such as iron, steel, nickel, or the like that can attenuate or prevent the magnetic field of the magnet 400 from reaching an outer surface of the nozzle assembly 101. The shield 122 may reduce or prevent the nozzle assembly 101 from accumulating magnetic particles on the outside surface thereof, which may otherwise interfere with cleaning operations. Additionally, or alternately, the shield 122 may reduce magnetic attraction between the nozzle assembly 101 and a ferromagnetic conduit 107 material, which can make cleaning operations difficult.

In the implementation shown, the magnet 400 is coupled to the stator 113 and the conductor 121 is coupled to the rotor 114, such that the conductor spins with the rotor 114. In other embodiments, the magnet 400 may be coupled to the rotor 114 and the conductor 121 may be coupled to the stator 113. In some implementations, the magnet 400 may be classified as an N42, N35, N52 magnet or other suitable classification.

Flow Straighteners

With reference to FIG. 5, a nozzle assembly 101 may include a flow straightener assembly 500. The flow straightener assembly 520 or other flow straightener assemblies may be used in the nozzle assembly 101, as described in U.S. Patent Application Publication 2021/0252531 owned by the applicant and incorporated by reference herein for all purposes.

For example, the flow straightener assembly 500 includes a first plurality of tubes and a second plurality of tubes having a different quantity of tubes compared to the first plurality of tubes. For purposes of illustration, the nozzle assembly 101 may include a first flow straightener assembly 520, and one or more subsequent flow straightener assemblies. The first flow straightener assembly 520 and subsequent flow straightener assemblies may be fluidly coupled with one another and arranged along a fluid flow path that extends between the inlet 504 and the outlet 506. For example, the flow straightener assemblies can be fluidly connected with one another and arranged in series within an internal channel of a nozzle housing 502. In this regard, fluid entering the flow straightener assembly 500 at the inlet 504 may pass through each of the flow straightener assemblies 520 and/or subsequent flow straightener assemblies, and the associated plurality of tubes within each straightener.

With specific reference to the first flow straightener assembly 520, this assembly can include at least a first flow straightener 530, a second flow straightener 540, an insert 550, a first sealing feature 560, and a second sealing feature 562. The first flow straightener 530 includes a first collection of ducts extending therethrough and the second flow straightener 540 includes a second collection of ducts extending therethrough. In some cases, as shown herein at FIG. 5, the first and second collection of ducts can be defined by corresponding first and second plurality of tubes arranged within the respective one of the first and second flow straighteners 530, 540. In other cases, other constructions are possible, including forming one or more of the ducts through a solid block of material. The first and second flow straighteners 530, 540 are fluidly associatable with one another and arranged within the insert 550. The insert 550 generally defines a receiving structure for axially aligning the first and second flow straighteners 530, 540 with one another, and for subsequent assembly within the housing 502. To facilitate fluidic engagement with other flow straightener assemblies, the housing 502, and/or the nozzle tip, sealing features 560, 562, such as o-rings can be seated at opposing ends of the insert and be used to establish a substantial fluid-tight connection between an adjacent engaged component.

Each insert 550 may include two, e.g., flow straighteners 530, 540, or three or more flow straighteners, each having a discrete number of tubes that can be the same or a different from the other flow straighteners. For instance, the insert 550 may include a first flow straightener 530 including 2-10 tubes, a second flow straightener 540 including 2-10 tubes, and optional third, fourth, fifth flow straighteners, and so on, each including 2-10 tubes. In a particular example, a first flow straightener includes 2 tubes, a second includes 4 tubes, a third includes 6 tubes, a fourth includes 7 tubes, and a fifth includes 8 tubes. In another example a first flow straightener includes 2 tubes, a second includes 4 tubes, a third includes 3 tubes, a fourth includes 5 tubes, a fifth includes 4 tubes, and a sixth includes 9 tubes. In yet another example, a first flow straightener includes 3 tubes, a second includes 8 tubes, a third includes 3 tubes, and a fourth includes 8 tubes.

The flow straightener assembly 500 may have certain advantages. The present disclosure describes nozzle assemblies that facilitate production of a substantially laminar fluid flow, and maintenance of the laminar fluid flow across a target distance or range. Nozzle assemblies of the present disclosure can be adapted to produce a substantially laminar fluid flow and maintain the fluid flow as a tight, intact, and/or controlled stream for at least 20 feet, for at least 30 feet, or for at least a greater distance from the nozzle assembly. As used herein "laminar" fluid flow can refer to a flow that that is smooth, orderly, with fluid particles generally moving relative to one another along a direction of flow with little to no mixing, in contrast to turbulent flow which may produce rough or dissipated flow patterns.

The substantially laminar fluid flow produced by the nozzle assembly of the present disclosure is therefore an intact and concentrated stream of fluid at the target distance. This can allow the nozzle assembly to be used in industrial or municipal settings requiring high pressure water streams that remain intact over long distances. As one example, the nozzle assembly is used for cleaning operations in confined spaces, such as a sewer vault or lift station, conduit 107, or vessel. The nozzle assembly can be adapted to direct the fluid flow through a collection of tubes or ducts defined therethrough to induce laminar flow. The collection of tubes or ducts alternates in quantity along a length of the nozzle assembly. The nozzle assembly is adapted to pass fluid through distinct stages or sections defining the alternating quantity of tubes or ducts to produce a substantially laminar fluid stream. The substantially laminar fluid stream can be used for cleaning operations, such as high-pressure cleaning operations of confined spaces, including sewer vaults and lift stations. However, such confined spaces can extend into the ground by at least 20 feet, by at least 30 feet, or by at least a greater depth, and thus include debris and other contaminants at these or greater depths that require a substantially intact stream of fluid for satisfactory cleaning.

The nozzle assemblies, systems, and methods of manufacture of the present disclosure may mitigate such hindrances by producing a fluid stream that can remain intact as it travels fully into the confined space. In this way, the nozzle assembly can be used to clean the confined space without requiring personnel to enter the confined space. For example, a worker can stand outside of the confined space and use the nozzle assembly to advance a substantially laminar fluid flow into the confined space to a complete depth or other cross-dimension of the confined space. To facilitate the foregoing, the nozzle assembly can employ one or more flow straightener assemblies that operate to induce laminar flow. A flow straightener assembly can be arranged along a flow path of the fluid in the nozzle, and include a first plurality of tubes and a second plurality of tubes. The first and second plurality of tubes can be arranged within the nozzle assembly such that the nozzle assembly directs fluid flow through each of the plurality of tube sequentially or otherwise in series. The first plurality of tubes can be defined by a different quantity of tubes than the second plurality of tubes. For example, the first plurality of tubes can include a greater quantity of tubes than the second plurality of tubes, such as where the first plurality of tubes is defined by seven tubes, and the second plurality of tubes is defined by three tubes. The alternating quantity of tubes cooperate to induce and maintain the substantially laminar fluid flow across the target distance.

Assembly

As best shown in FIG. 1D and FIG. 1F, the nozzle assembly 101 may be assembled as described herein, for example. The nozzle assembly 101 may be assembled or dis-assembled in an order other than as shown, and one or more components may be omitted, and other components added as understood by the skilled artisan.

Beginning with the nose 137, the seat 166 and its seal may be inserted into the nose 137, such as by press fitting. The sleeve 164 may be fitted within the nose 137. The rotating element 143 may be inserted into the flow chamber 154. The inner shell member 165 may be inserted behind the sleeve 164. The front housing 119 and one or more seals 146 may be coupled to the nose 137 via the threaded engagement mechanism 162. One or more of the components of the nozzle assembly 101 may include facets 142 (FIG. 1C, FIG. 1G2) such that components can be secured in a wrench or vice such as for assembly, dis-assembly, maintenance, inspection, assembly with other rotating assemblies (e.g., the sleeve 124, shaft 123, and thrust bearing 135), or the like.

One or more seals 146 may be installed on the respective end portion 172a or end portion 172b of the shaft 123. The end portion 172b may be coupled to the boss 161 of the front housing 119.

The bushings 136 and/or O-ring(s) may be installed on the sleeve 124. The assembled sleeve 124 and bushing 136 and/or O-ring(s) may be installed into the distribution channel 132 in the middle portion 111, e.g., by press fitting. The assembled sleeve 124 may be threadedly engaged with the middle housing 138 of the middle portion 111. The seal 125a may be installed on the front housing 119 and the seal 125b may be installed on the middle portion 111. The shield 122 may be installed over the conductor 121, and the combined assembly may be installed in the aperture 148 of the middle portion 111, e.g., by press fitting. The shaft 123 may be slid into the sleeve 124 installed in the middle portion 111.

The sleeve 120 and the magnet 400 may be installed on the protrusion 152 of the rear housing 139, e.g., by press fitting. The assembled rear housing 139/magnet 400 sub-assembly may be coupled to the end portion 172a of the shaft 123, e.g., by a keyed or threaded connection or using adhesives. Thus, the magnet 400 may be disposed within or proximate to the conductor 121.

Nozzles 116a/b and/or rear nozzle 115, with the respective flow straightener assemblies 500, if used, may be installed from the outside of the assembled nozzle assembly 101. This exterior access of the nozzles may be an advantage of the nozzle assembly 101 over known nozzles assemblies in that the nozzles may be easily changed if damaged, worn, or for different cleaning fluids 141 or applications.

Operation

In embodiments, a method of cleaning a sewer pipe may involve supplying the cleaning fluid 141 to the nozzle assembly 101. The cleaning fluid 141 may be supplied from a supply line connected to the nozzle assembly 101 such as via a threaded, quick connect, or other secure connection. The nozzle assembly 101 may deliver the cleaning fluid 141 to the stator 113 which may be included at a front portion 110 optionally including a first nozzle such as the aperture 143 configured to direct a first stream of the cleaning fluid in a forward direction of the nozzle assembly 101 and at a wall of the trunk conduit 103 such as a sewer pipe, and may direct the cleaning fluid 141 to the rear portion 112 including a second nozzle such as the rear nozzle 115 configured to direct a second stream of the cleaning fluid 141 rearward of the nozzle assembly 101 and at the wall of the sewer pipe. The rotor 114 may be disposed between the front portion 110 and the rear portion 112 along a longitudinal axis of the nozzle assembly 101 and may include a third nozzle such as the nozzles 116a/b configured to direct a third stream of the cleaning fluid 141 at the sewer pipe. A magnetic brake such as the braking system 149 or components thereof may be disposed between the stator 113 and the rotor 114.

In some methods of use, the cleaning fluid 141 may be supplied to the nozzle assembly 101 via the inlet 117 such as via the supply conduit 106. The cleaning fluid 141 may be distributed by the distribution channel 132 through the rear portion 112, through a portion of the shaft 123 and then through the middle portion 111, and through the shaft 123 and then through the front portion 110. Accordingly, fluid may be delivered from the nozzle assembly 101 via multiple nozzles disposed throughout the portions of the nozzle assembly (e.g., front, middle and rear portions 110, 111, 112). For example, a first portion of the cleaning fluid 141 may be directed from the inlet 117 to the manifold 145 and the apertures 147 to the one or more rear nozzles 115 of the rear portion 112. A second portion of the cleaning fluid 141 may flow along the distribution channel 132 formed, at least partially, in the shaft 123, and distributed to the branches 131, to the manifold 130, through the apertures 129, to the manifold 128, and ultimately to the apertures 153 and the nozzles 116a/b of the middle portion 111. The cleaning fluid 141 may be supplied to the nozzles 116a/b, regardless of a radial position of the middle housing 138. A third portion of the cleaning fluid 141 may flow through the distribution channel 132 formed, at least partially, by the inlet member 127, the flow chamber 154, the inlet 170 of the rotating element 143, the outlet 168 of the rotating element 143 and through the outlet aperture 134 of the front portion 110. The cleaning fluid 141 exiting the outlet aperture 134 may provide a rotating (e.g., spiral) stream of the cleaning fluid 141 rotating about a central axis of the nozzle assembly 101. In additional or alternative implementations, the cleaning fluid 141 may exit the outlet aperture 134 along the central axis of the nozzle assembly 101 or at an angle relative thereto. For instance nozzles 116a/b and/or rear nozzles 115 may be installed into the front portion 110 in a manner similar to that described in connection with the middle portion 111 and rear portion 112, and such nozzle(s) may be directed along the central axis, at an angle relative to the central axis or combinations. As provided herein, the first and/or second portions of cleaning fluid 141 emitted from the nozzles of the nozzle assembly 101 may exert a propulsive force to propel the nozzle assembly 101 during operation and use, and as will be understood, while the third portion of the cleaning fluid 141 may simultaneously exert some repelling force, the net force exerted by the operation of the nozzles is a positive propelling force to cause the nozzle assembly 101 to be propelled in a forward or distal direction during operation and use.

As discussed previously the nozzles 116a/b may be disposed at a compound angle, such that the reaction force of the stream 108 leaving the nozzle 116a/b may cause the middle housing 138 of the middle portion 111 to spin about the longitudinal axis 118, acting as a rotor 114.

Figure 6:
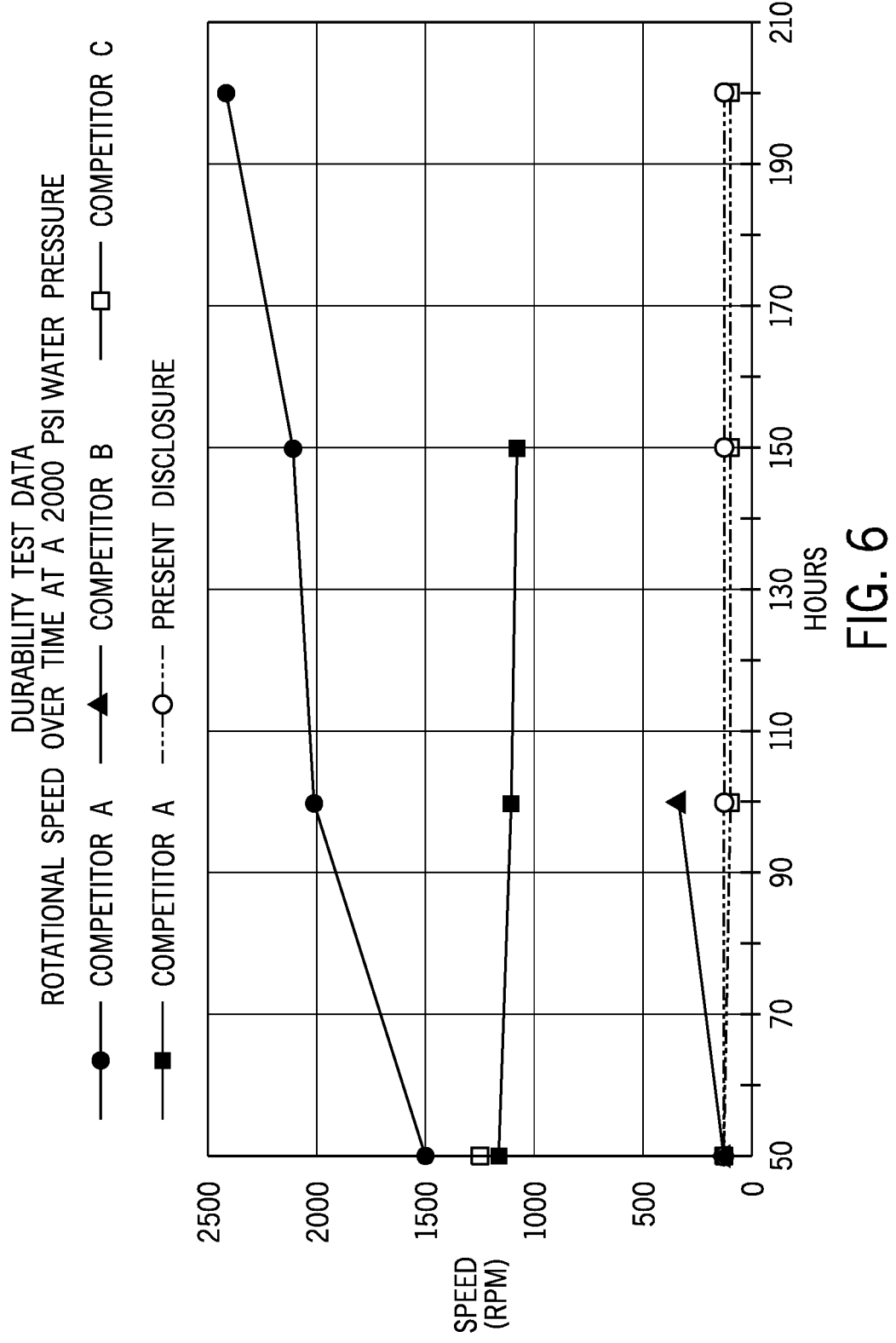
FIG. 6 is an example of test data comparing an embodiment of a nozzle assembly in accordance with the present disclosure against existing nozzle assemblies.

As the rotor 114 spins, the magnetic field generated by the magnetic poles 404a/b may induce an eddy current in the conductor 121, and generate a braking force or torque that opposes the motion of the rotor 114. Thus, the motion of the rotor 114 may be controlled. The braking system 149 may provide certain benefits over other types of braking systems used in nozzle assemblies. For example as shown in Table 1 and FIG. 6, known braking system such as friction brakes, viscous brakes, and the like may speed up, slow down, or seize and fail, when operated at consistent delivery pressure of the cleaning fluid 141. For example, a "Competitor A" nozzle increased in speed over the course of 200 hours beginning at 1500 rpm and ending at 2400 rpm. A "Competitor B" nozzle began spinning at 160 rpm and failed between 100 and 150 hours. A "Competitor C" nozzle began spinning at 126 rpm and then decreased in speed to 90 RPM. A "Competitor D" nozzle began spinning at 1150 rpm and then failed between 150 and 200 hours. An example of an embodiment of a nozzle assembly 101 according to the present disclosure operated with a consistent rotor 114 speed of 120 rpm over time, thereby providing consistent cleaning performance and reliability compared to known nozzles. In some embodiments, the braking system 149 controls the speed of the rotor to about 100-120 RPM when the cleaning fluid 141 is supplied at a pressure of about 2000 psi.

TABLE 1

Example test data at 2000 psi delivery pressure of a cleaning fluid 141.

| Nozzle/Hours | Speed (RPM) | | | | |
|---|---|---|---|---|---|
| | 50 | 100 | 150 | 200 | 220 |
| Competitor A | 1500 | 2000 | 2100 | 2400 | FAIL |
| Competitor B | 160 | 350 | FAIL | FAIL | FAIL |
| Competitor C | 126 | 96 | 90 | 90 | FAIL |
| Competitor D | 1150 | 1100 | 1070 | FAIL | FAIL |

TABLE 1-continued

Example test data at 2000 psi delivery pressure of a cleaning fluid 141.

| | Speed (RPM) | | | | |
|---|---|---|---|---|---|
| Present Disclosure | 170 | 170 | 170 | 170 | 170 |

In various implementations, the speed of the rotor may be equal to or greater than 80 RPM, or about 80 RPM up to about 200 RPM, such as or equal to or greater than about 80 RPM and less than or equal to about 100, 110, 120, 130, 140, 150, 160 or 170 RPM, or greater than or equal to about 80, 90, 100, 110, 120, or 130 RPM and less than or equal to about 150, 160, or 170 RPM. For example, the resistance of the eddy current controls the rotary motion to about 100, 110, 120, 130, 140, 150, 160, 170, 180, 190, or 200 RPM or any of the aforementioned RPM ranges when the cleaning fluid is supplied at a pressure of about 500 to 5000 pounds per square inch (PSI), such as about 500 to about 2000, about 500 to about 3000, about 500 to about 4000, about 1000 to about 2000, about 1000 to about 3000, about 1000 to about 4000, about 1000 to about 5000, about 2000 to about 3000, about 2000 to about 4000, about 2000 to about 5000, about 3000 to about 4000, about 3000 to about 5000, about 4000 to about 5000 PSI. The term "about" as used herein means+/−10%.

Various changes may be made in the form, construction and arrangement of the components of the present disclosure without departing from the disclosed subject matter or without sacrificing all of its material advantages. The form described is merely explanatory, and it is the intention of the following claims to encompass and include such changes. Moreover, while the present disclosure has been described with reference to various embodiments and implementations, it will be understood that these embodiments are illustrative and that the scope of the disclosure is not limited to them. Many variations, modifications, additions, and improvements are possible. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A nozzle assembly comprising:
a stator comprising:
   a front portion including a first nozzle configured to direct a first stream of a cleaning fluid in a forward direction of the nozzle assembly;
   a rear portion including a second nozzle configured to direct a second stream of the cleaning fluid rearward of the nozzle assembly; and
   a shaft fluidly coupling the front portion to the rear portion;
a rotor disposed between the front portion and the rear portion along a longitudinal axis of the nozzle assembly and surrounding at least a portion of the shaft, the rotor including a third nozzle configured to direct a third stream of the cleaning fluid; and
a magnetic brake disposed at least within an interior of the rotor and arranged concentric with portions of the shaft and the rear portion of the stator along the longitudinal axis,
wherein the shaft comprises a plurality of branches fluidly coupled to the third nozzle, and wherein the plurality of branches and the third nozzle are arranged distal to the magnetic brake.

2. The nozzle assembly of claim 1, wherein the magnetic brake comprises:
   a magnet disposed on a protrusion of the rear portion; and
   a conductor disposed within an aperture formed in at least one of the stator and the rotor.

3. The nozzle assembly of claim 2, wherein the conductor comprises a non-ferrous metal.

4. The nozzle assembly of claim 2, further comprising a magnetic shield disposed outward from the longitudinal axis relative to the magnet.

5. The nozzle assembly of claim 4, wherein the magnetic shield comprises a ferrous metal.

6. The nozzle assembly of claim 2, wherein the magnet comprises a cylindrical shell.

7. The nozzle assembly of claim 6, wherein the cylindrical shell includes a plurality of radially polarized portions.

8. The nozzle assembly of claim 6, wherein:
   a first radially polarized portion of the plurality of radially polarized portions includes a first pole having a first magnetic polarity and a second pole having a second magnetic polarity opposite the first magnetic polarity, wherein the first pole is disposed closer to the longitudinal axis than the second pole; and
   a second radially polarized portion of the plurality of radially polarized portions includes a third pole having the first magnetic polarity and a fourth pole having the second magnetic polarity, wherein the fourth pole is disposed closer to the longitudinal axis than the third pole.

9. The nozzle assembly of claim 8, wherein the first radially polarized portion and the second radially polarized portion are adjacent to one another in the magnet.

10. The nozzle assembly of claim 8, wherein the magnet comprises a plurality of first radially polarized portions and a plurality of second radially polarized portions interleaved with one another in the magnet.

11. The nozzle assembly of claim 2 wherein the conductor is disposed in at least one of the stator and the rotor, proximate to the magnet.

12. The nozzle assembly of claim 11, wherein a direction of the third stream of the cleaning fluid causes a rotary motion of the rotor.

13. The nozzle assembly of claim 12, wherein the rotary motion causes a relative movement between the magnet and the conductor, such that the magnet induces an eddy current in the conductor that opposes the rotary motion.

14. The nozzle assembly of claim 12, wherein the rotary motion is a function of pressure.

15. The nozzle assembly of claim 1, further comprising a plurality of second nozzles, each configured to emit respective a plurality of second streams of the cleaning fluid.

16. The nozzle assembly of claim 15, wherein the plurality of second nozzles are disposed circumferentially about an aperture formed in the rear portion.

17. The nozzle assembly of claim 1, wherein the rear portion is configured to couple to a supply conduit configured to supply the cleaning fluid to the nozzle assembly.

18. The nozzle assembly of claim 15, wherein the plurality of second nozzles are disposed at an angle with respect to the longitudinal axis of the nozzle assembly.

19. A nozzle assembly comprising:
a stator comprising:
   a front portion;

a rear portion including a first nozzle configured to direct a first stream of cleaning fluid rearward of the nozzle assembly; and a shaft fluidly coupling the front portion to the rear portion;

a rotor disposed between the front portion and the rear portion along a longitudinal axis of the nozzle assembly and surrounding at least a portion of the shaft, the rotor including a second nozzle configured to direct a second stream of the cleaning fluid; and a magnetic brake disposed at least within an interior of the rotor and arranged concentric at least with portions of the shaft and the rear portion of the stator along the longitudinal axis, wherein the shaft comprises a plurality of branches coupled to the second nozzle, and wherein the plurality of branches and the second nozzle are arranged distal to the magnetic brake.

\* \* \* \* \*